(12) United States Patent
Huang et al.

(10) Patent No.: US 9,810,841 B2
(45) Date of Patent: Nov. 7, 2017

(54) SILICON PHOTONIC DEVICE, OPTICAL POLARISATION BEAM COUPLER AND OPTICAL WAVEGUIDE COUPLER

(71) Applicant: Telefonaktiebolaget LM Ericsson (publ), Stockholm (SE)

(72) Inventors: Wei-Ping Huang, Stockholm (SE); Mats Johansson, Stockholm (SE); Stephane Lessard, Montreal (CA); Francesco Testa, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/324,550

(22) PCT Filed: Jul. 8, 2014

(86) PCT No.: PCT/EP2014/064549
§ 371 (c)(1),
(2) Date: Jan. 6, 2017

(87) PCT Pub. No.: WO2016/004982
PCT Pub. Date: Jan. 14, 2016

(65) Prior Publication Data
US 2017/0168236 A1  Jun. 15, 2017

(51) Int. Cl.
*G02B 6/00* (2006.01)
*G02B 6/126* (2006.01)
(Continued)

(52) U.S. Cl.
CPC ......... *G02B 6/126* (2013.01); *G02B 6/02285* (2013.01); *G02B 6/12002* (2013.01);
(Continued)

(58) Field of Classification Search
CPC ...... G02B 6/2746; G02B 6/126; G02B 6/105; G02B 6/00; G02F 1/093; H04B 10/2569
See application file for complete search history.

(56) References Cited

U.S. PATENT DOCUMENTS 7,400,399 B2 * 7/2008 Wawro ................. G01N 21/648
                                                              356/328
9,664,854 B2 * 5/2017 Kato ........................ G02B 6/12
(Continued)

FOREIGN PATENT DOCUMENTS

WO    2015144224 A1    10/2015

OTHER PUBLICATIONS

Chui, Chun-Chia et al., "Polarization Independent Grating Coupler for Silicon-on-Insulator Waveguides", IEEE International Conference on Optical MEMS & Nanophotonics (OPT MEMS), Aug. 9-12, 2010, 171-172.
(Continued)

*Primary Examiner* — Jennifer Doan
(74) *Attorney, Agent, or Firm* — Murphy, Bilak & Homiller, PLLC

(57) ABSTRACT

A silicon photonic device (1) comprising: a silicon core (2) having a core refractive index; and a structure formed in the silicon core, comprising: a first refractive index variation pattern (4) across the core in a first direction (x) and having a first modulation depth ($H_1$); and a second refractive index variation pattern (6) across the core in a second, orthogonal, direction (y) and having a second modulation depth ($H_2$), less than the first modulation depth. The first refractive index variation pattern overlays the second refractive index variation pattern, forming a three-dimensional structure. The first refractive index variation pattern only supports propagation of light having a TM mode between the first direction and a third direction (z) and the second refractive index variation pattern only supports propagation of light having a TE mode
(Continued)

between the second direction and the third direction. An optical waveguide coupler is also disclosed. The optical waveguide coupler comprises a plurality of planar waveguides, each supporting propagation of one of a TE and a TM mode, and a plurality of silicon diffractive gratings each comprising a planar silicon core and a grating structure formed by a periodic refractive index variation extending across the core in a first direction and having a grating period and a modulation depth, these selected to cause the grating to support propagation of the light between the first direction and a third direction substantially orthogonal to the planar silicon core. Additionally the optical waveguide coupler comprises a plurality of tapered planar waveguides.

18 Claims, 15 Drawing Sheets

(51) Int. Cl.
| | | |
|---|---|---|
| *G02B 6/125* | (2006.01) | |
| *G02B 6/12* | (2006.01) | |
| *G02B 6/124* | (2006.01) | |
| *G02B 6/122* | (2006.01) | |
| *G02B 6/27* | (2006.01) | |
| *G02B 6/02* | (2006.01) | |
| *G02B 6/42* | (2006.01) | |

(52) U.S. Cl.
CPC ............ *G02B 6/124* (2013.01); *G02B 6/125* (2013.01); *G02B 6/1228* (2013.01); *G02B 6/2726* (2013.01); *G02B 6/2773* (2013.01); *G02B 6/4213* (2013.01); *G02B 2006/12061* (2013.01); *G02B 2006/12121* (2013.01); *G02B 2006/12135* (2013.01); *G02B 2006/12147* (2013.01)

(56) References Cited

U.S. PATENT DOCUMENTS

| | | |
|---|---|---|
| 2010/0265504 A1 | 10/2010 | Kopp et al. |
| 2010/0322555 A1 | 12/2010 | Vermeulen et al. |
| 2012/0155806 A1 | 6/2012 | Doerr et al. |

OTHER PUBLICATIONS

Halir, Robert et al., "Continuously apodized fiber-to-chip surface grating coupler with refractive index engineered subwavelength structure", Optics Letters, vol. 35, No. 19, Oct. 1, 2010, 3243-3245.

Lockwood, David J. et al., "Silicon Photonics II", Topics in Applied Physics, vol. 119, 2011, 1-269.

Taillaert, Dirk et al., "A Compact Two-Dimensional Grating Coupler Used as a Polarization Splitter", IEEE Photonics Technology Letters, vol. 15, No. 9, Sep. 2003, 1249-1251.

Van Laere, Frederik et al., "Focusing Polarization Diversity Grating Couplers in Silicon-on-Insulator", Journal of Lightwave Technology, vol. 27, No. 5, Mar. 1, 2009, 612-618.

Wang, Qian et al., "Ultracompact TM-Pass Silicon Nanophotonic Waveguide Polarizer and Design", IEEE Photonics Journal, vol. 2, Issue 1, Jan. 29, 2010, 49-56.

* cited by examiner

SILICON PHOTONIC DEVICE, OPTICAL POLARISATION BEAM COUPLER AND OPTICAL WAVEGUIDE COUPLER

TECHNICAL FIELD

The invention relates to a silicon photonic device and to a method of fabricating a silicon photonic device. The invention further relates to an optical polarisation beam coupler and to an optical source comprising the optical polarisation beam coupler. The invention further relates to an optical waveguide coupler and to a communications network base station comprising the optical waveguide coupler.

BACKGROUND

It is known in complementary metal-oxide-semiconductor, CMOS, photonic integrated circuits to use single polarisation grating couplers, SPGC, to couple optical signals of a preselected polarisation, transverse electric, TE, mode or transverse magnetic, TM, mode into a planar silicon photonic waveguide, typically from an optical fibre. An SPGC-TE or SPGC-TM is a passive CMOS silicon photonically enabled device which typically comprises 3 major functional parts; a one-dimensional diffractive grating followed by a taper and a single-mode silicon photonic waveguide. A typical design following the silicon on insulate (SOI) concept consists of a silicon based substrate, a silicon core layer having a refractive index of about 3.474, a thin SiOx over-cladding provided on top of the silicon core, having a thickness of a few hundred nm and a refractive index of about 1.50, a thick $SiO_2$ under-cladding provided under the silicon core layer, having a thickness of a few μm and the refractive index of about 1.444, which is often called the buried oxide (BOX), and a total internal reflection mirror between the under-cladding and the substrate. In order to support TE-mode propagation, a planar waveguide should in general have a width which is larger than its height, typically by a factor of 2. To support TM-mode propagation a planar waveguide should have a width which is much smaller than its height, typically also a factor of 2, as set out in from "Silicon Photonics II, Components and Integration", edited by David J. Lockwood and Lorenzo Pavesi, 2011.

SUMMARY

It is an object to provide an improved a silicon photonic device. It is further object to provide an improved method of fabricating a silicon photonic device. It is further object to provide an improved optical polarisation beam coupler. It is further object to provide an improved optical waveguide coupler.

A first aspect of the invention provides a silicon photonic device comprising a silicon core having a core refractive index and a structure formed in the silicon core. The structure comprises a first refractive index variation pattern and a second refractive index variation pattern. The first refractive index variation pattern extends across the core in a first direction, and the first refractive index variation pattern has a first modulation depth. The second refractive index variation pattern extends across the core in a second direction, substantially orthogonal to the first direction. The second refractive index variation pattern has a second modulation depth, less than the first modulation depth. The first refractive index variation pattern overlays the second refractive index variation pattern, thereby forming a three-dimensional structure. The first refractive index variation patterns only supports propagation of light having a transverse magnetic mode between the first direction and a third direction, substantially orthogonal to the first direction and the second direction. The second refractive index variation pattern only supports propagation of light having a transverse electric mode between the second direction and the third direction.

The silicon photonic device supports both TE-mode optical signals and TM-mode optical signals. Orthogonally polarised, TE-mode and TM-mode, optical signals may be combined by the silicon photonic device and an optical signal having both TE-mode and TM-mode components may be separated into two orthogonally polarised optical signals, output to two different directions. The silicon photonic device enables these functions to be performed in single device within a photonic integrated circuit, such as a CMOS photonic integrated circuit.

In an embodiment, the structure is a diffractive grating structure. The first refractive index variation pattern is a first periodic refractive index modulation extending across the core in the first direction. The first periodic refractive index modulation has a first grating period and the first modulation depth ($H_1$). The second refractive index variation pattern is a second periodic refractive index modulation extending across the core in the second direction. The second periodic refractive index modulation has a second grating period and the second modulation depth ($H_2$). The three-dimensional structure is a three-dimensional grating structure. The first grating period and the first modulation depth together cause the device only to support propagation of light having a transverse magnetic mode between the first direction and a third direction (z), substantially orthogonal to the first direction and the second direction. The second grating period and the second modulation depth together cause the device only to support propagation of light having a transverse electric mode between the second direction and the third direction.

In an embodiment, the first grating period is equal to the second grating period.

In an embodiment, the first grating period is different to the second grating period.

In an embodiment, the silicon core has a length in the second direction, a width in the first direction and a height in the third direction. The three-dimensional grating structure comprises a plurality of first regions and a plurality of second regions. Each of the plurality of first regions has the length of the silicon core and a width substantially equal to one half of the first grating period. Each of the plurality of first regions comprises a silicon core layer and a grating layer being of the first modulation depth, which is less than the height of the silicon core. The grating layer comprises an optically transmissive medium having a lower refractive index than the core refractive index. Each of the plurality of second regions has the length of the silicon core and a width substantially equal to one half of the first grating period. Each of the plurality of second regions comprises a silicon core layer and a grating layer. Each grating layer comprises a plurality of high index grating elements and a plurality of low index grating elements arranged in an alternating series. Each of the grating elements has a length substantially equal to one half of the second grating period. The high index grating elements are formed of the silicon core and the low index grating elements comprise an optically transmissive medium having a lower refractive index than the core refractive index. The first regions and the second regions are arranged in an alternating series across the width of the silicon core in the first direction.

The silicon photonic diffractive grating may therefore require just two different refractive indices to form both the first and second periodic refractive index modulations.

In an embodiment, each of the plurality of first regions comprises a region of the silicon core etched to the first modulation depth. Each low index grating element of each of the plurality of second regions comprises a region of the silicon core etched to the second modulation depth. The silicon photonic diffractive grating may be formed from a single silicon core material.

In an embodiment, the first refractive index variation pattern comprises a plurality of first channels formed in the silicon core. Each of the plurality of first channels extends length ways in the second direction and has a first width. Adjacent first channels are separated by substantially the first width. Each of the plurality of first channels is of the first modulation depth. The second refractive index variation pattern comprises a plurality of second channels formed in the silicon core. Each of the plurality of second channels extends length ways in the first direction generally orthogonally across the first channels. Each of the plurality of second channels has a second width. Adjacent second channels are separated by substantially the second width. Each of the plurality of second channels is of the second modulation depth.

In an embodiment, the first width is equal to the second width.

In an embodiment, the first width is different to the second width.

In an embodiment, the transverse electric mode is a fundamental transverse electric mode and the transverse magnetic mode is a fundamental transverse magnetic mode.

A second aspect of the invention provides a method of fabricating a silicon photonic device. The method comprises providing a silicon core having a core refractive index. The method comprises forming a first refractive index variation pattern in the silicon core. The first refractive index variation pattern is formed extending across the core in a first direction. The first refractive index variation pattern has a first modulation depth. The method comprises forming a second refractive index variation pattern in the silicon core. The second refractive index variation pattern is formed extending across the core in a second direction, substantially orthogonal to the first direction. The second refractive index variation pattern has a second modulation depth, which is less than the first modulation depth. The first refractive index variation pattern and the second refractive index variation pattern overlay one another, thereby forming a three-dimensional structure. The first refractive index variation pattern only supports propagation of light having a transverse magnetic mode between the first direction and a third direction, substantially orthogonal to the first direction and the second direction. The second refractive index variation pattern only supports propagation of light having a transverse electric mode between the second direction and the third direction.

The method enables a silicon photonic device which supports both TE-mode optical signals and TM-mode optical signals to be fabricated. The method enables fabrication of a silicon photonic device which enables orthogonally polarised, TE-mode and TM-mode, optical signals to be combined and which enables an optical signal having both TE-mode and TM-mode components to be separated into two orthogonally polarised optical signals, output to two different directions.

In an embodiment, the first refractive index variation pattern is a first periodic refractive index modulation formed extending across the core in the first direction. The first periodic refractive index modulation has a first grating period and the first modulation depth ($H_1$). The second refractive index variation pattern is a second periodic refractive index modulation formed extending across the core in the second direction. The second periodic refractive index variation has a second grating period and the second modulation depth ($H_2$). The three-dimensional structure is a three-dimensional grating structure. The first grating period and the first modulation depth together cause the device only to support propagation of light having a transverse magnetic mode between the first direction and a third direction (z), substantially orthogonal to the first direction and the second direction. The second grating period and the second modulation depth together cause the device only to support propagation of light having a transverse electric mode between the second direction and the third direction.

In an embodiment, the silicon core has a length in the second direction, a width in the first direction and a height in the third direction. The method comprises forming a plurality of first regions and a plurality of second regions. Each of the plurality of first regions is formed having the length of the silicon core and a width substantially equal to one half of the first grating period. Each of the plurality of first regions are formed by forming a grating layer having the first modulation depth, which is less than the height of the silicon core. The grating layer is formed of an optically transmissive medium having a lower refractive index than the core refractive index. Each of the plurality of second regions is formed having the length of the silicon core and a width substantially equal to one half of the first grating period. Each of the plurality of second regions is formed by forming a grating layer comprising a plurality of high index grating elements and a plurality of low index grating elements arranged in an alternating series. Each of the grating elements has a length substantially equal to one half of the second grating period. The low index grating elements are formed of an optically transmissive medium having a lower refractive index than the core refractive index and are of the second modulation depth. The first regions and the second regions are formed in an alternating series across the width of the silicon core in the first direction. The silicon photonic diffractive grating may therefore be fabricated by the method using just two different refractive indices to form both the first and second periodic refractive index modulations.

In an embodiment, the first grating period is equal to the second grating period.

In an embodiment, the first grating period is different to the second grating period.

In an embodiment, each of the plurality of first regions is formed by etching the respective region of the silicon core to the first modulation depth. Each low index grating element of each of the plurality of second regions is formed by etching a respective region of the silicon core to the second modulation depth. The silicon photonic device may be fabricated by etching a single silicon core material.

In an embodiment, the method comprises forming the second refractive index variation pattern and then forming the first refractive index variation pattern generally orthogonally across the second refractive index variation pattern. The first refractive index variation pattern' is formed by forming a plurality of first channels in the silicon core. Each of the plurality of first channels extends length ways in the second direction. Each of the plurality of first channels has a first width and is of the first modulation depth. Adjacent first channels are separated by substantially the first width.

The second refractive index variation pattern is formed by forming a plurality of second channels in the silicon core. Each of the plurality of second channels extends length ways in the first direction. Each of the plurality of second channels has a second width and is of the second modulation depth. Adjacent second channels are separated by substantially the second width. The method enables a silicon photonic device having a three-dimensional grating structure to be formed from two orthogonally arranged sets of channels of two modulation depths.

In an embodiment, the first width is equal to the second width.

In an embodiment, the first width is different to the second width.

In an embodiment, the transverse electric mode is a fundamental transverse electric mode and the transverse magnetic mode is a fundamental transverse magnetic mode.

A third aspect of the invention provides an optical polarisation beam coupler comprising a silicon photonic device, a first planar waveguide, a second planar waveguide, a first tapered planar waveguide and a second tapered planar waveguide. The silicon photonic device comprises a silicon core having a core refractive index and a structure formed in the silicon core. The structure comprises a first refractive index variation pattern and a second refractive index variation pattern. The first refractive index variation pattern extends across the core in a first direction, and the first refractive index variation pattern has a first modulation depth. The second refractive index variation pattern extends across the core in a second direction, substantially orthogonal to the first direction. The second refractive index variation pattern has a second modulation depth, less than the first modulation depth. The first refractive index variation pattern overlays the second refractive index variation pattern, thereby forming a three-dimensional structure. The first refractive index variation patterns only supports propagation of light having a transverse magnetic mode between the first direction and a third direction, substantially orthogonal to the first direction and the second direction. The second refractive index variation pattern only supports propagation of light having a transverse electric mode between the second direction and the third direction.

The first planar waveguide has a width and has a height at least equal to the first modulation depth. The width and the height of the first planar waveguide together causes the first planar waveguide only to support propagation of light having the transverse magnetic mode. The second planar waveguide has a width and has a height at least equal to the second modulation depth, the width and the height of the second planar waveguide together causing the second planar waveguide only to support propagation of light having the transverse electric mode. The first tapered planar waveguide has a height at least equal to the height of the first planar waveguide. The first tapered planar waveguide has a wide end coupled to a first side of the silicon photonic device in the first direction and has a narrow end coupled to one end of the first planar waveguide. The second tapered planar waveguide has a height at least equal to the height of the second planar waveguide. The second tapered planar waveguide has a wide end coupled to a second side of the silicon photonic device in the second direction and has a narrow end coupled to one end of the second planar waveguide.

The optical polarisation beam coupler supports both TE-mode optical signals and TM-mode optical signals. Orthogonally polarised, TE-mode and TM-mode, optical signals may be combined by the optical polarisation beam coupler and an optical signal having both TE-mode and TM-mode components may be separated into two orthogonally polarised optical signals, output to two different directions. The optical polarisation beam coupler enables these functions to be performed in single device within a photonic integrated circuit, such as a CMOS photonic integrated circuit.

In an embodiment, the height of the first planar waveguide is greater than the width of the first planar waveguide. The height of the second planar waveguide is less than the width of the second planar waveguide. The first modulation depth is not greater than the height of the first planar waveguide and the second modulation depth is not greater than the height of the second planar waveguide.

In an embodiment, the structure is a diffractive grating structure. The first refractive index variation pattern is a first periodic refractive index modulation extending across the core in the first direction. The first periodic refractive index modulation has a first grating period and the first modulation depth ($H_1$). The second refractive index variation pattern is a second periodic refractive index modulation extending across the core in the second direction. The second periodic refractive index modulation has a second grating period and the second modulation depth ($H_2$). The three-dimensional structure is a three-dimensional grating structure. The first grating period and the first modulation depth together cause the device only to support propagation of light having a transverse magnetic mode between the first direction and a third direction (z), substantially orthogonal to the first direction and the second direction. The second grating period and the second modulation depth together cause the device only to support propagation of light having a transverse electric mode between the second direction and the third direction.

In an embodiment, the first grating period is equal to the second grating period.

In an embodiment, the first grating period is different to the second grating period.

In an embodiment, the silicon core has a length in the second direction, a width in the first direction and a height in the third direction. The three-dimensional grating structure comprises a plurality of first regions and a plurality of second regions. Each of the plurality of first regions has the length of the silicon core and a width substantially equal to one half of the first grating period. Each of the plurality of first regions comprises a silicon core layer and a grating layer being of the first modulation depth, which is less than the height of the silicon core. The grating layer comprises an optically transmissive medium having a lower refractive index than the core refractive index. Each of the plurality of second regions has the length of the silicon core and a width substantially equal to one half of the first grating period. Each of the plurality of second regions comprises a silicon core layer and a grating layer. Each gating layer comprises a plurality of high index grating elements and a plurality of low index grating elements arranged in an alternating series. Each of the grating elements has a length substantially equal to one half of the second grating period. The high index grating elements are formed of the silicon core and the low index grating elements comprise an optically transmissive medium having a lower refractive index than the core refractive index. The first regions and the second regions are arranged in an alternating series across the width of the silicon core in the first direction.

The silicon photonic diffractive grating may therefore require just two different refractive indices to form both the first and second periodic refractive index modulations.

In an embodiment, each of the plurality of first regions comprises a region of the silicon core etched to the first modulation depth. Each low index grating element of each of the plurality of second regions comprises a region of the silicon core etched to the second modulation depth. The silicon photonic diffractive grating may be formed from a single silicon core material.

In an embodiment, the first refractive index variation pattern comprises a plurality of first channels formed in the silicon core. Each of the plurality of first channels extends length ways in the second direction and has a first width. Adjacent first channels are separated by substantially the first width. Each of the plurality of first channels is of the first modulation depth. The second refractive index variation pattern comprises a plurality of second channels formed in the silicon core. Each of the plurality of second channels extends length ways in the first direction generally orthogonally across the first channels. Each of the plurality of second channels has a second width. Adjacent second channels are separated by substantially the second width. Each of the plurality of second channels is of the second modulation depth.

In an embodiment, the first width is equal to the second width.

In an embodiment, the first width is different to the second width.

In an embodiment, the transverse electric mode is a fundamental transverse electric mode and the transverse magnetic mode is a fundamental transverse magnetic mode.

A fourth aspect of the invention provides an optical waveguide coupler comprising a plurality of planar waveguides, a plurality of silicon photonic devices and a plurality of tapered planar waveguides. Each of the plurality of planar waveguides has a respective width and a respective height which together causes the respective planar waveguide only to support propagation of light having one of a transverse magnetic mode and a transverse electric mode. Each of the plurality of silicon photonic diffractive gratings comprises a planar silicon core having a core refractive index and a grating structure formed in the silicon core. Each grating structure comprises a periodic refractive index variation extending across the core generally in a respective first direction. The periodic refractive index variation has a grating period and a modulation depth. The grating period and the modulation depth of each silicon photonic diffractive grating are selected to cause the respective grating only to support propagation of said light supported by the respective one of the planar waveguides between the respective first direction and a third direction, substantially orthogonal to the planar silicon core. Each of the plurality of tapered planar waveguides is provided between a respective planar waveguide and a respective silicon photonic diffractive grating. Each of the plurality of tapered planar waveguides has a height at least equal to the height of the respective planar waveguide. Each of the plurality of tapered planar waveguides has a wide end coupled to a one end of the respective silicon photonic diffractive grating in the first direction and has a narrow end coupled to one end of the respective planar waveguide.

The optical waveguide coupler may simultaneously couple a plurality of optical signals, each having one of a TE mode and a TM mode, into a respective one of a plurality of planar waveguides. The optical waveguide coupler may simultaneously couple a plurality of optical signals, each having one of a TE mode and a TM mode, from a respective one of a plurality of planar waveguides.

In an embodiment, the silicon photonic diffractive gratings are arranged generally adjacent one another in a generally circular arrangement. Each respective tapered planar waveguide and planar waveguide extends generally outwardly away from the silicon photonic diffractive gratings. The optical waveguide coupler may simultaneously couple a plurality of optical signals, each having one of a TE mode and a TM mode, received from a respective core of a multi-core fibre into a respective one of a plurality of planar waveguides. The optical waveguide coupler may simultaneously couple a plurality of optical signals, each having one of a TE mode and a TM mode, from a respective one of a plurality of planar waveguides into a respective core of a multi-core fibre.

In an embodiment, the silicon photonic diffractive gratings are arranged generally adjacent one another in one of a pentagon-like, hexagon-like, heptagon-like, octagon-like and nonagon-like arrangement.

In an embodiment, the silicon core of each of the silicon photonic diffractive gratings has a generally tapered shape. The said one end of the silicon core has a first width and has a generally curved shape. An opposite end of the silicon core has a second width, greater than the first width, and has a generally curved shape. Each grating structure comprises a plurality of core refractive index regions and a plurality of lower index regions. Each of the regions extends lengthways across the respective width of the silicon core and has a respective curved shape and each region has a width substantially equal to one half of the grating period. Each reduced index region comprises a silicon core layer and a grating layer of the modulation depth, which is less than a height of the silicon core, and each grating layer comprising an optically transmissive medium having a lower refractive index than the core refractive index. This may reduce the mode-field diameter mismatch between the respective core of a multi-core fibre and the respective planar waveguide.

A fifth aspect of the invention provides an optical source comprising a first laser, a second laser, an optical polarisation beam coupler and an output. The first laser is arranged to generate a first optical signal having a first state of polarisation and a first optical frequency. The second laser is arranged to generate a second optical signal having a second state of polarisation, substantially orthogonal to the first state of polarisation, and having a second optical frequency. The second optical frequency is different to the first optical frequency by a preselected frequency difference, Av. The optical polarisation beam coupler is arranged to combine the first optical signal and the second optical signal into a composite optical signal comprising both the first optical signal and the second optical signal having said substantially orthogonal states of polarisation. The optical polarisation beam coupler comprises a silicon photonic device, a first planar waveguide, a second planar waveguide, a first tapered planar waveguide and a second tapered planar waveguide. The silicon photonic device comprises a silicon core having a core refractive index and a structure formed in the silicon core. The structure comprises a first refractive index variation pattern and a second refractive index variation pattern. The first refractive index variation pattern extends across the core in a first direction, and the first refractive index variation pattern has a first modulation depth. The second refractive index variation pattern extends across the core in a second direction, substantially orthogonal to the first direction. The second refractive index variation pattern has a second modulation depth, less than the first modulation depth. The first refractive index variation pattern overlays the second refractive index variation pattern, thereby forming a three-dimensional structure. The first refractive index variation patterns only supports propagation of light having a transverse magnetic mode between the first direction and a third direction, substantially orthogonal to the first direction and the second direction. The second refractive index variation pattern only supports propagation of light having a transverse electric mode between the second direction and the third direction. The first planar waveguide has a width and has a height at least equal to the first modulation depth. The width and the height of the first planar waveguide together causes the first planar waveguide only to support propagation of light having the transverse magnetic mode. The second planar waveguide has a width and has a height at least equal to the second modulation depth, the width and the height of the second planar waveguide together causing the second planar waveguide only to support propagation of light having the transverse electric mode. The first tapered planar waveguide has a height at least equal to the height of the first planar waveguide. The first tapered planar waveguide has a wide end coupled to a first side of the silicon photonic device in the first direction and has a narrow end coupled to one end of the first planar waveguide. The second tapered planar waveguide has a height at least equal to the height of the second planar waveguide. The second tapered planar waveguide has a wide end coupled to a second side of the silicon photonic device in the second direction and has a narrow end coupled to one end of the second planar waveguide. The output is arranged to output the composite optical signal.

The optical source may generate an optical signal which has an optical power associated with any arbitrary state of polarisation, SOP, that is maintained within a preselected range. The optical polarisation beam coupler supports both TE-mode optical signals and TM-mode optical signals. Orthogonally polarised, TE-mode and TM-mode, optical signals may be combined by the optical polarisation beam coupler and an optical signal having both TE-mode and TM-mode components may be separated into two orthogonally polarised optical signals, output to two different directions. The optical polarisation beam coupler enables these functions to be performed in single device within a photonic integrated circuit, such as a CMOS photonic integrated circuit.

In an embodiment, the height of the first planar waveguide is greater than the width of the first planar waveguide. The height of the second planar waveguide is less than the width of the second planar waveguide. The first modulation depth is not greater than the height of the first planar waveguide and the second modulation depth is not greater than the height of the second planar waveguide.

In an embodiment, the structure is a diffractive grating structure. The first refractive index variation pattern is a first periodic refractive index modulation extending across the core in the first direction. The first periodic refractive index modulation has a first grating period and the first modulation depth ($H_1$). The second refractive index variation pattern is a second periodic refractive index modulation extending across the core in the second direction. The second periodic refractive index modulation has a second grating period and the second modulation depth ($H_2$). The three-dimensional structure is a three-dimensional grating structure. The first grating period and the first modulation depth together cause the device only to support propagation of light having a transverse magnetic mode between the first direction and a third direction (z), substantially orthogonal to the first direction and the second direction. The second grating period and the second modulation depth together cause the device only to support propagation of light having a transverse electric mode between the second direction and the third direction.

In an embodiment, the first grating period is equal to the second grating period.

In an embodiment, the first grating period is different to the second grating period.

In an embodiment, the silicon core has a length in the second direction, a width in the first direction and a height in the third direction. The three-dimensional grating structure comprises a plurality of first regions and a plurality of second regions. Each of the plurality of first regions has the length of the silicon core and a width substantially equal to one half of the first grating period. Each of the plurality of first regions comprises a silicon core layer and a grating layer being of the first modulation depth, which is less than the height of the silicon core. The grating layer comprises an optically transmissive medium having a lower refractive index than the core refractive index. Each of the plurality of second regions has the length of the silicon core and a width substantially equal to one half of the first grating period. Each of the plurality of second regions comprises a silicon core layer and a grating layer. Each gating layer comprises a plurality of high index grating elements and a plurality of low index grating elements arranged in an alternating series. Each of the grating elements has a length substantially equal to one half of the second grating period. The high index grating elements are formed of the silicon core and the low index grating elements comprise an optically transmissive medium having a lower refractive index than the core refractive index. The first regions and the second regions are arranged in an alternating series across the width of the silicon core in the first direction.

The silicon photonic diffractive grating may therefore require just two different refractive indices to form both the first and second periodic refractive index modulations.

In an embodiment, each of the plurality of first regions comprises a region of the silicon core etched to the first modulation depth. Each low index grating element of each of the plurality of second regions comprises a region of the silicon core etched to the second modulation depth. The silicon photonic diffractive grating may be formed from a single silicon core material.

In an embodiment, the first refractive index variation pattern comprises a plurality of first channels formed in the silicon core. Each of the plurality of first channels extends length ways in the second direction and has a first width. Adjacent first channels are separated by substantially the first width. Each of the plurality of first channels is of the first modulation depth. The second refractive index variation pattern comprises a plurality of second channels formed in the silicon core. Each of the plurality of second channels extends length ways in the first direction generally orthogonally across the first channels. Each of the plurality of second channels has a second width. Adjacent second channels are separated by substantially the second width. Each of the plurality of second channels is of the second modulation depth.

In an embodiment, the first width is equal to the second width.

In an embodiment, the first width is different to the second width.

A sixth aspect of the invention provides communications network base station node comprising an optical waveguide coupler. The optical waveguide coupler comprises a plurality of planar waveguides, a plurality of silicon photonic devices and a plurality of tapered planar waveguides. Each of the plurality of planar waveguides has a respective width and a respective height which together causes the respective planar waveguide only to support propagation of light having one of a transverse magnetic mode and a transverse electric mode. Each of the plurality of silicon photonic diffractive gratings comprises a planar silicon core having a core refractive index and a grating structure formed in the silicon core. Each grating structure comprises a periodic refractive index variation extending across the core generally in a respective first direction. The periodic refractive index variation has a grating period and a modulation depth. The grating period and the modulation depth of each silicon photonic diffractive grating are selected to cause the respective grating only to support propagation of said light supported by the respective one of the planar waveguides between the respective first direction and a third direction, substantially orthogonal to the planar silicon core. Each of the plurality of tapered planar waveguides is provided between a respective planar waveguide and a respective silicon photonic diffractive grating. Each of the plurality of tapered planar waveguides has a height at least equal to the height of the respective planar waveguide. Each of the plurality of tapered planar waveguides has a wide end coupled to a one end of the respective silicon photonic diffractive grating in the first direction and has a narrow end coupled to one end of the respective planar waveguide.

The optical waveguide coupler may simultaneously couple a plurality of optical signals, each having one of a TE mode and a TM mode, into a respective one of a plurality of planar waveguides within the base station node. The optical waveguide coupler may simultaneously couple a plurality of optical signals, each having one of a TE mode and a TM mode, from a respective one of a plurality of planar waveguides within the base station node.

In an embodiment, the silicon photonic diffractive gratings are arranged generally adjacent one another in a generally circular arrangement. Each respective tapered planar waveguide and planar waveguide extends generally outwardly away from the silicon photonic diffractive gratings. The optical waveguide coupler may simultaneously couple a plurality of optical signals, each having one of a TE mode and a TM mode, received from a respective core of a multi-core fibre into a respective one of a plurality of planar waveguides. The optical waveguide coupler may simultaneously couple a plurality of optical signals, each having one of a TE mode and a TM mode, from a respective one of a plurality of planar waveguides into a respective core of a multi-core fibre.

In an embodiment, the silicon photonic diffractive gratings are arranged generally adjacent one another in one of a pentagon-like, hexagon-like, heptagon-like, octagon-like and nonagon-like arrangement.

In an embodiment, the silicon core of each of the silicon photonic diffractive gratings has a generally tapered shape. The said one end of the silicon core has a first width and has a generally curved shape. An opposite end of the silicon core has a second width, greater than the first width, and has a generally curved shape. Each grating structure comprises a plurality of core refractive index regions and a plurality of lower index regions. Each of the regions extends lengthways across the respective width of the silicon core and has a respective curved shape and each region has a width substantially equal to one half of the grating period. Each reduced index region comprises a silicon core layer and a grating layer of the modulation depth, which is less than a height of the silicon core, and each grating layer comprising an optically transmissive medium having a lower refractive index than the core refractive index. This may reduce the mode-field diameter mismatch between the respective core of a multi-core fibre and the respective planar waveguide.

A seventh aspect of the invention provides a communications network light source system comprising a first node comprising an optical source, a second node comprising an optical waveguide coupler, and an optical link provided between the first node and the second node. The optical source comprises a first laser, a second laser, an optical polarisation beam coupler and an output. The first laser is arranged to generate a first optical signal having a first state of polarisation and a first optical frequency. The second laser is arranged to generate a second optical signal having a second state of polarisation, substantially orthogonal to the first state of polarisation, and having a second optical frequency. The second optical frequency is different to the first optical frequency by a preselected frequency difference, $\Delta v$. The optical polarisation beam coupler is arranged to combine the first optical signal and the second optical signal into a composite optical signal comprising both the first optical signal and the second optical signal having said substantially orthogonal states of polarisation. The optical polarisation beam coupler comprises a silicon photonic device, a first planar waveguide, a second planar waveguide, a first tapered planar waveguide and a second tapered planar waveguide. The silicon photonic device comprises a silicon core having a core refractive index and a structure formed in the silicon core. The structure comprises a first refractive index variation pattern and a second refractive index variation pattern. The first refractive index variation pattern extends across the core in a first direction, and the first refractive index variation pattern has a first modulation depth. The second refractive index variation pattern extends across the core in a second direction, substantially orthogonal to the first direction. The second refractive index variation pattern has a second modulation depth, less than the first modulation depth. The first refractive index variation pattern overlays the second refractive index variation pattern, thereby forming a three-dimensional structure. The first refractive index variation patterns only supports propagation of light having a transverse magnetic mode between the first direction and a third direction, substantially orthogonal to the first direction and the second direction. The second refractive index variation pattern only supports propagation of light having a transverse electric mode between the second direction and the third direction. The first planar waveguide has a width and has a height at least equal to the first modulation depth. The width and the height of the first planar waveguide together causes the first planar waveguide only to support propagation of light having the transverse magnetic mode. The second planar waveguide has a width and has a height at least equal to the second modulation depth, the width and the height of the second planar waveguide together causing the second planar waveguide only to support propagation of light having the transverse electric mode. The first tapered planar waveguide has a height at least equal to the height of the first planar waveguide. The first tapered planar waveguide has a wide end coupled to a first side of the silicon photonic device in the first direction and has a narrow end coupled to one end of the first planar waveguide. The second tapered planar waveguide has a height at least equal to the height of the second planar waveguide. The second tapered planar waveguide has a wide end coupled to a second side of the silicon photonic device in the second direction and has a narrow end coupled to one end of the second planar waveguide. The output is arranged to output the composite optical signal. The optical waveguide coupler comprises a plurality of planar waveguides, a plurality of silicon photonic diffractive gratings and a plurality of tapered planar waveguides. Each of the plurality of planar waveguides has a respective width and a respective height which together causes the respective planar waveguide only to support propagation of light having one of a transverse magnetic mode and a transverse electric mode. Each of the plurality of silicon photonic diffractive gratings comprises a planar silicon core having a core refractive index and a grating structure formed in the silicon core. Each grating structure comprises a periodic refractive index variation extending across the core generally in a respective first direction. The periodic refractive index variation has a grating period and a modulation depth. The grating period and the modulation depth of each silicon photonic diffractive grating are selected to cause the respective grating only to support propagation of said light supported by the respective one of the planar waveguides between the respective first direction and a third direction, substantially orthogonal to the planar silicon core. Each of the plurality of tapered planar waveguides is provided between a respective planar waveguide and a respective silicon photonic diffractive grating. Each of the plurality of tapered planar waveguides has a height at least equal to the height of the respective planar waveguide. Each of the plurality of tapered planar waveguides has a wide end coupled to a one end of the respective silicon photonic diffractive grating in the first direction and has a narrow end coupled to one end of the respective planar waveguide. The optical link is arranged to deliver the composite optical signal output by the optical source to the second node, The first node is provided at a first location and the second node is provided at a second location, different to the first location. The first node is climate controlled and the second node is not climate controlled.

The light source system may enable the optical source to be operated under climate control, for example the temperature being maintained within a preselect range, remote from the second node, which is not climate controlled. The light source system may therefore enable the second node to be provided at a location where it is not possible to provide climate controlled conditions suitable for operation of an optical source, the optical source within the first node being a remote light source for the second node. An optical signal which has an optical power associated with any arbitrary state of polarisation, SOP, that is maintained within a preselected range, may be generated by the optical source under climate controlled conditions and delivered via the optical link to the second node.

In an embodiment, the optical link comprises a feeder optical fibre coupled at one end to the output of the optical source and having a polarisation mode dispersion coefficient and a length, and wherein the preselected frequency difference, $\Delta v$ is inversely proportional to a differential group delay, $\tau$, which is proportional to the polarisation mode dispersion coefficient and the length of the feeder optical fibre. This may enable an optical signal to be delivered which has an optical power associated with any arbitrary state of polarisation, SOP, that is maintained within a preselected range at the end of a feeder fibre of a preselected length. This may enable the optical signal to be transmitted across up to tens of km of SMF while maintaining the optical power associated with a preselected SOP within a preselected range, which may allow good performance of a single-polarization photonic integrated device provided at the end of the feeder fibre.

In an embodiment, the first node additionally comprises climate control apparatus.

In an embodiment, the first location is a climate controlled location.

In an embodiment, the height of the first planar waveguide is greater than the width of the first planar waveguide. The height of the second planar waveguide is less than the width of the second planar waveguide. The first modulation depth is not greater than the height of the first planar waveguide and the second modulation depth is not greater than the height of the second planar waveguide.

In an embodiment, the structure is a diffractive grating structure. The first refractive index variation pattern is a first periodic refractive index modulation extending across the core in the first direction. The first periodic refractive index modulation has a first grating period and the first modulation depth ($H_1$). The second refractive index variation pattern is a second periodic refractive index modulation extending across the core in the second direction. The second periodic refractive index modulation has a second grating period and the second modulation depth ($H_2$). The three-dimensional structure is a three-dimensional grating structure. The first grating period and the first modulation depth together cause the device only to support propagation of light having a transverse magnetic mode between the first direction and a third direction (z), substantially orthogonal to the first direction and the second direction. The second grating period and the second modulation depth together cause the device only to support propagation of light having a transverse electric mode between the second direction and the third direction.

In an embodiment, the first grating period is equal to the second grating period.

In an embodiment, the first grating period is different to the second grating period.

In an embodiment, the silicon core has a length in the second direction, a width in the first direction and a height in the third direction. The three-dimensional grating structure comprises a plurality of first regions and a plurality of second regions. Each of the plurality of first regions has the length of the silicon core and a width substantially equal to one half of the first grating period. Each of the plurality of first regions comprises a silicon core layer and a grating layer being of the first modulation depth, which is less than the height of the silicon core. The grating layer comprises an optically transmissive medium having a lower refractive index than the core refractive index. Each of the plurality of second regions has the length of the silicon core and a width substantially equal to one half of the first grating period. Each of the plurality of second regions comprises a silicon core layer and a grating layer. Each gating layer comprises a plurality of high index grating elements and a plurality of low index grating elements arranged in an alternating series. Each of the grating elements has a length substantially equal to one half of the second grating period. The high index grating elements are formed of the silicon core and the low index grating elements comprise an optically transmissive medium having a lower refractive index than the core refractive index. The first regions and the second regions are arranged in an alternating series across the width of the silicon core in the first direction.

The silicon photonic diffractive grating may therefore require just two different refractive indices to form both the first and second periodic refractive index modulations.

In an embodiment, each of the plurality of first regions comprises a region of the silicon core etched to the first modulation depth. Each low index grating element of each of the plurality of second regions comprises a region of the silicon core etched to the second modulation depth. The silicon photonic diffractive grating may be formed from a single silicon core material.

In an embodiment, the first refractive index variation pattern comprises a plurality of first channels formed in the silicon core. Each of the plurality of first channels extends length ways in the second direction and has a first width. Adjacent first channels are separated by substantially the first width. Each of the plurality of first channels is of the first modulation depth. The second refractive index variation pattern comprises a plurality of second channels formed in the silicon core. Each of the plurality of second channels extends length ways in the first direction generally orthogonally across the first channels. Each of the plurality of second channels has a second width. Adjacent second channels are separated by substantially the second width. Each of the plurality of second channels is of the second modulation depth.

In an embodiment, the first width is equal to the second width.

In an embodiment, the first width is different to the second width.

In an embodiment, the transverse electric mode is a fundamental transverse electric mode and the transverse magnetic mode is a fundamental transverse magnetic mode.

In an embodiment, the silicon photonic diffractive gratings are arranged generally adjacent one another in a generally circular arrangement. Each respective tapered planar waveguide and planar waveguide extends generally outwardly away from the silicon photonic diffractive gratings. The optical waveguide coupler may simultaneously couple a plurality of optical signals, each having one of a TE mode and a TM mode, received from a respective core of a multi-core fibre into a respective one of a plurality of planar waveguides. The optical waveguide coupler may simultaneously couple a plurality of optical signals, each having one of a TE mode and a TM mode, from a respective one of a plurality of planar waveguides into a respective core of a multi-core fibre.

In an embodiment, the silicon photonic diffractive gratings are arranged generally adjacent one another in one of a pentagon-like, hexagon-like, heptagon-like, octagon-like and nonagon-like arrangement.

In an embodiment, the silicon core of each of the silicon photonic diffractive gratings has a generally tapered shape. The said one end of the silicon core has a first width and has a generally curved shape. An opposite end of the silicon core has a second width, greater than the first width, and has a generally curved shape. Each grating structure comprises a plurality of core refractive index regions and a plurality of lower index regions. Each of the regions extends lengthways across the respective width of the silicon core and has a respective curved shape and each region has a width substantially equal to one half of the grating period. Each reduced index region comprises a silicon core layer and a grating layer of the modulation depth, which is less than a height of the silicon core, and each grating layer comprising an optically transmissive medium having a lower refractive index than the core refractive index. This may reduce the mode-field diameter mismatch between the respective core of a multi-core fibre and the respective planar waveguide.

Embodiments of the invention will now be described, by way of example only, with reference to the accompanying drawings.

DETAILED DESCRIPTION

Figure 1:
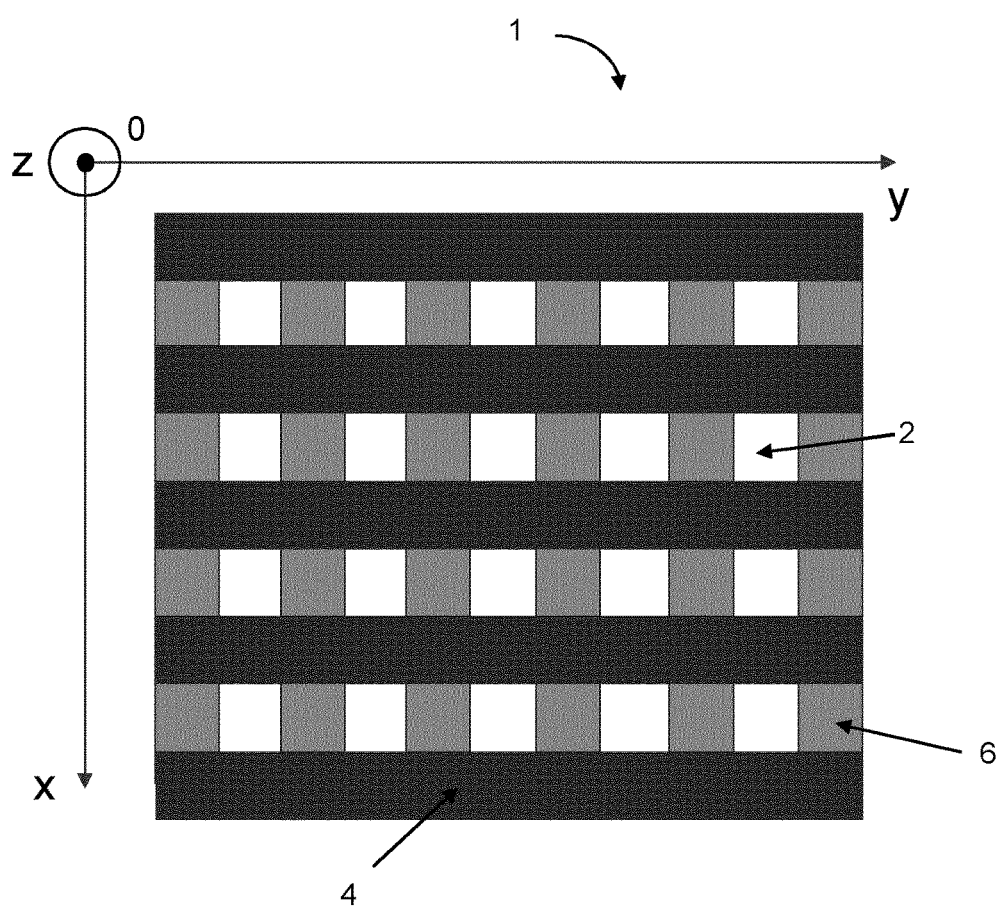
FIG. 1 is a diagrammatic plan view of part of a silicon photonic device according to a first embodiment of the invention.

Referring to FIG. 1, a first embodiment of the invention provides a silicon photonic device 1 comprising a silicon core 2 having a core refractive index and a structure formed in the silicon core.

The structure comprises a first refractive index variation pattern 4 extending across the core in a first direction, x, and a second refractive index variation pattern 6 extending across the core in a second direction, y, substantially orthogonal to the first direction. The first refractive index variation pattern has a first modulation depth, $H_1$ and the second refractive index variation pattern has a second modulation depth, $H_2$, which is less than the first modulation depth.

The first refractive index modulation pattern overlays the second refractive index modulation pattern, thereby forming a three-dimensional structure. The first refractive index modulation pattern only supports propagation of light having a transverse magnetic mode between the first direction and a third direction, z, substantially orthogonal to the first direction and the second direction. The second refractive index modulation pattern only supports propagation of light having a transverse electric mode between the second direction and the third direction.

Figure 2:
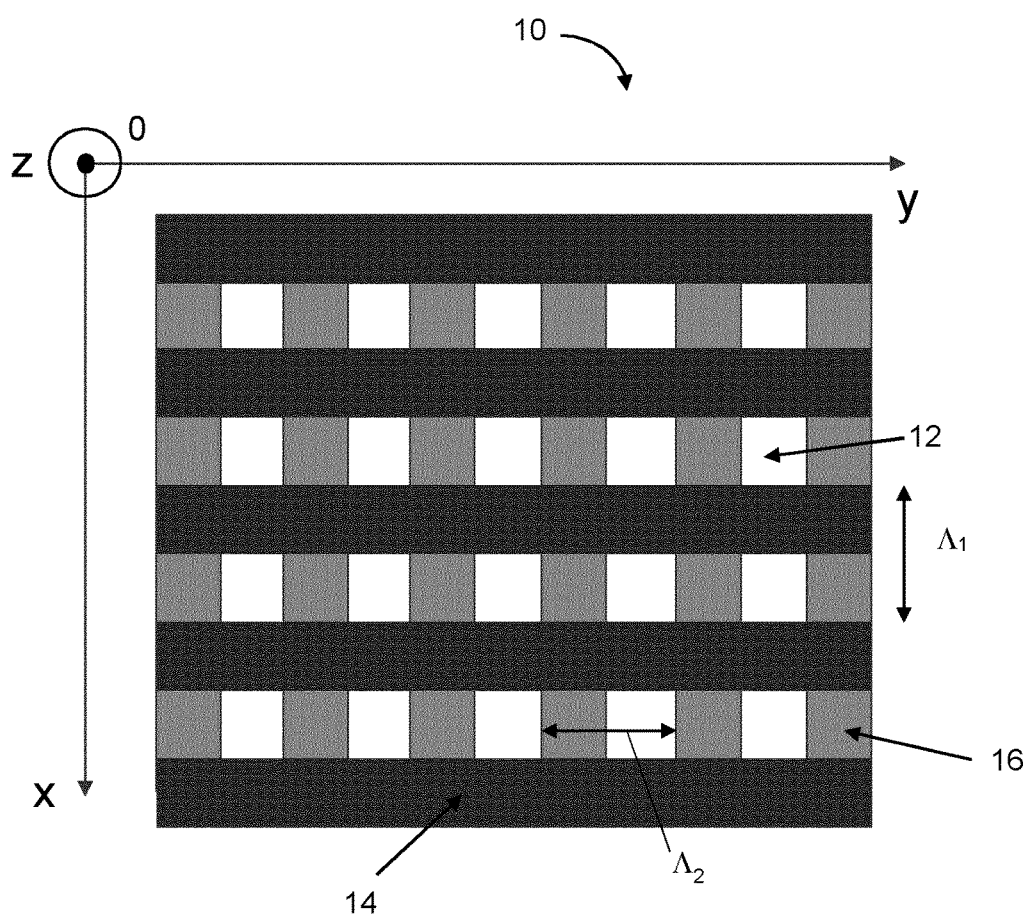
FIG. 2 is a diagrammatic plan view of part of a silicon photonic device according to a second embodiment of the invention.

Referring to FIG. 2, a second embodiment of the invention provides a silicon photonic device 10 comprising a silicon core 12 having a core refractive index and a structure formed in the silicon core.

In this embodiment, the structure is a diffractive grating structure. The first refractive index variation pattern is a first periodic refractive index modulation 14 extending across the core in the first direction, x, The second refractive index variation pattern is a second periodic refractive index modulation 16 extending across the core in the second direction, y, substantially orthogonal to the first direction. The first periodic refractive index modulation has a first grating period, $\Lambda_1$, and the first modulation depth, $H_1$. The second periodic refractive index modulation has a second grating period, $\Lambda_2$, and the second modulation depth, $H_2$.

The first periodic refractive index modulation overlays the second periodic refractive index modulation, thereby forming a three-dimensional grating structure. Here the first grating period is the same as the second grating period but the grating periods may alternatively be different.

The first grating period and the first modulation depth together cause the grating structure only to support propagation of light having a transverse magnetic, TM, mode between the first direction and a third direction, z, substantially orthogonal to the first direction and the second direction. The second grating period and the second modulation depth together cause the grating structure only to support propagation of light having a transverse electric, TE, mode between the second direction and the third direction.

Figure 3:
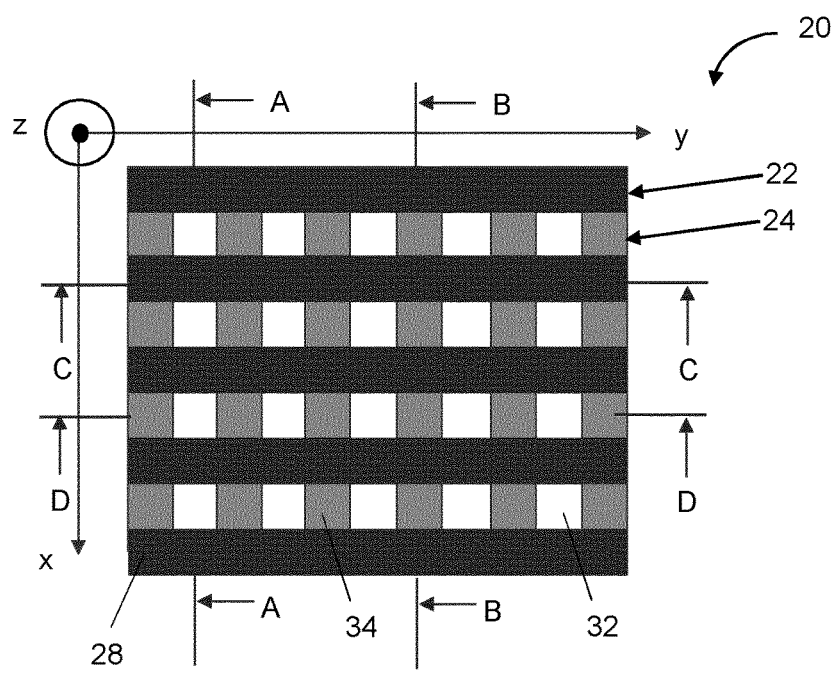
FIG. 3 is a diagrammatic plan view of part of a silicon photonic device according to a third embodiment of the invention.
Figure 4:
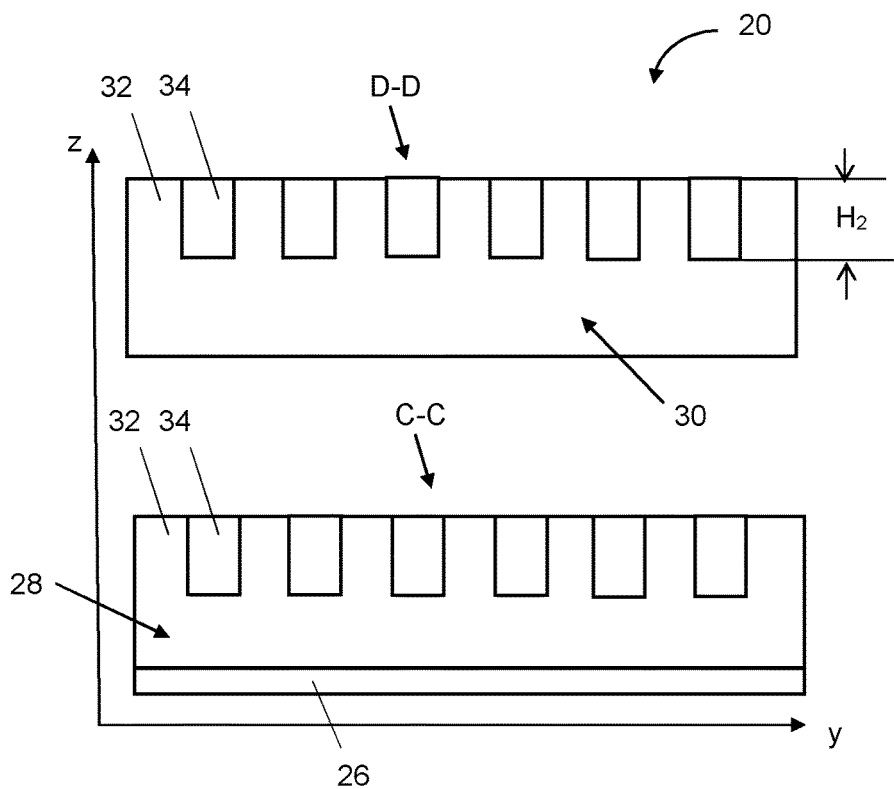
FIG. 4 shows diagrammatic sectional views along part of lines C-C and D-D of FIG. 3.
Figure 5:
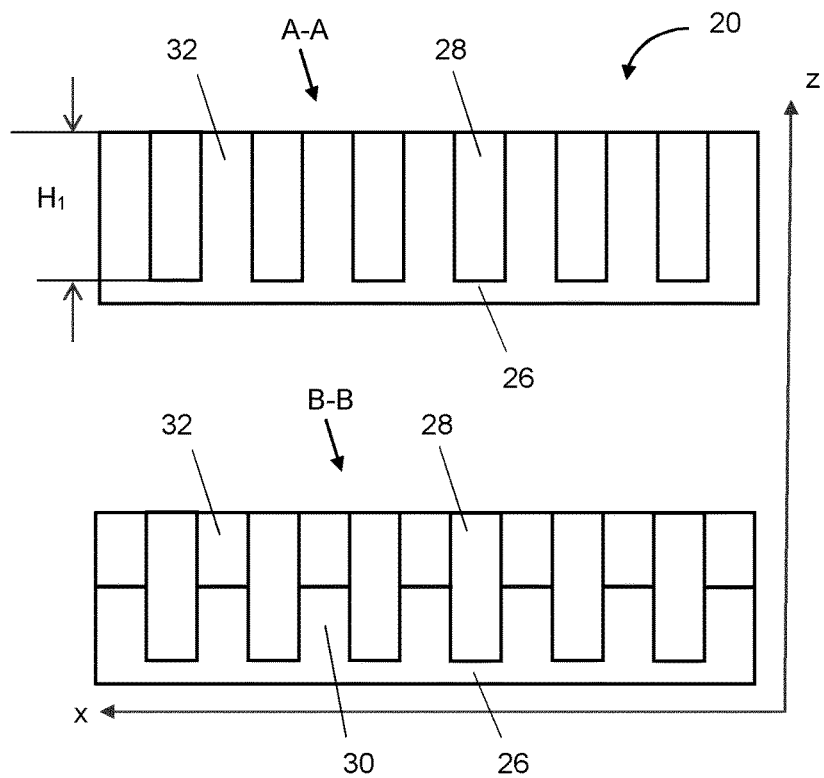
FIG. 5 shows diagrammatic schematic sectional views along part of lines A-A and B-B of FIG. 3.

Referring to FIGS. 3 to 5, a third embodiment of the invention provides a silicon photonic device 20 which is similar to the silicon photonic device 10 of the second embodiment, with the following modifications. For clarity, FIGS. 4 and 5 show only the silicon core 12 but it will be understood by the skilled person that the silicon core will be provided on a silicon substrate and a silicon oxide under-cladding may be provided between the silicon core and the silicon substrate, and a silicon oxide over-cladding may be provided on top of the silicon core.

In this embodiment, the silicon core has a length in the second direction, y, a width in the first direction, x, and a height in the third direction, z. The three-dimensional grating structure comprises a plurality of first regions 22 and a plurality of second regions 24, which are arranged in an alternating series across the width of the silicon core in the first direction.

Each of the first regions 22 extends for the length of the silicon core and has a width substantially equal to one half of the first grating period. Each first region comprises a silicon core layer 26 and a grating layer 28. The grating layer extends into the silicon core, in the z direction, to the first modulation depth. The grating layer comprising an optically transmissive medium which has a lower refractive index than the refractive index of the silicon core.

Each of the second regions 24 also extends for the length of the silicon core and has a width substantially equal to one half of the first grating period. Each second region comprises a silicon core layer 30 and a grating layer 32, 34. Each grating layer comprises a plurality of high index grating regions 32 and a plurality of low index grating regions 34, which are arranged in an alternating series. Each of the grating regions has a length substantially equal to one half of the second grating period. The high index grating regions are regions of the silicon core and the low index grating regions comprise an optically transmissive medium which has a lower refractive index than the core refractive index.

The first grating period and the first modulation depth together cause the grating structure only to support propagation of light having a fundamental TM mode, TM01, and the second grating period and the second modulation depth together cause the grating structure only to support propagation of light having a fundamental TE mode, TE01.

Figure 6:
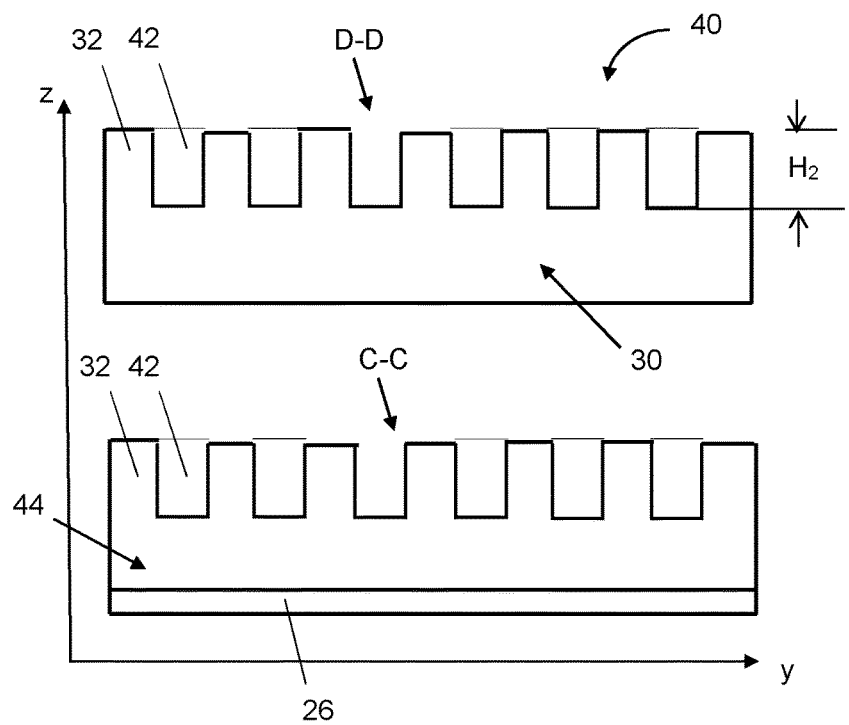
FIG. 6 shows diagrammatic schematic sectional views along part of lines C-C and D-D of a silicon photonic device according to a fourth embodiment of the invention having the same plan view as the grating of FIG. 3.
Figure 7:
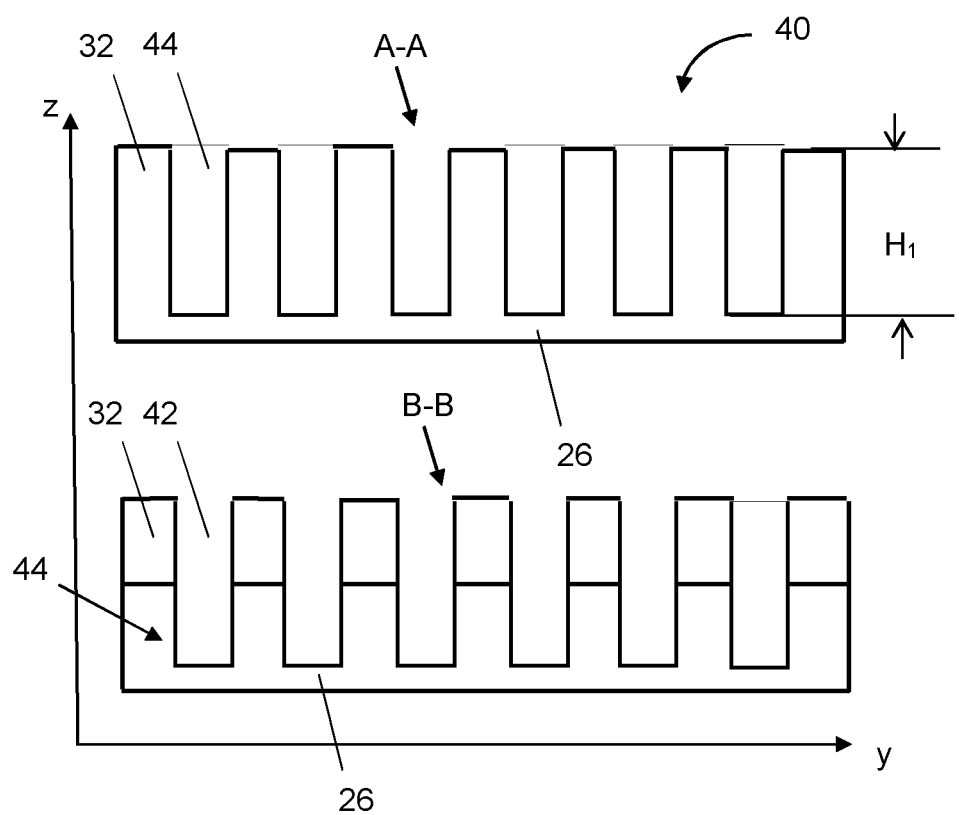
FIG. 7 shows diagrammatic sectional views along part of lines C-C and D-D of the silicon photonic device according to the third embodiment of the invention.

Referring to FIGS. 6 and 7, a fourth embodiment of the invention provides a silicon photonic device 40 which is similar to the silicon photonic device 1 of the first embodiment, with the following modifications. The same reference number are retained for corresponding features. For clarity, FIGS. 6 and 7 again show only the silicon core 2 and it will be understood by the skilled person that the silicon core will be provided on a silicon substrate and a silicon oxide under-cladding may be provided between the silicon core and the silicon substrate, and a silicon oxide over-cladding may be provided on top of the silicon core.

The first refractive index variation pattern comprises a plurality of first channels 44 formed in the silicon core. In this embodiment, each of the first channels 44 are etched into the silicon core to the first modulation depth. Each of the first channels extends for the length of the silicon core and has a first width. Adjacent channels 44 are separated by the first width.

The second refractive index variation pattern comprises a plurality of second channels 42 formed in the silicon core. Each of the second channels 42 are etched into the silicon core to the second modulation depth. Each of the second channels extends for the width of the silicon core, length ways in the first direction generally orthogonally across the first channels. The second channels each have a second width and are separated by the second width.

Figure 8:
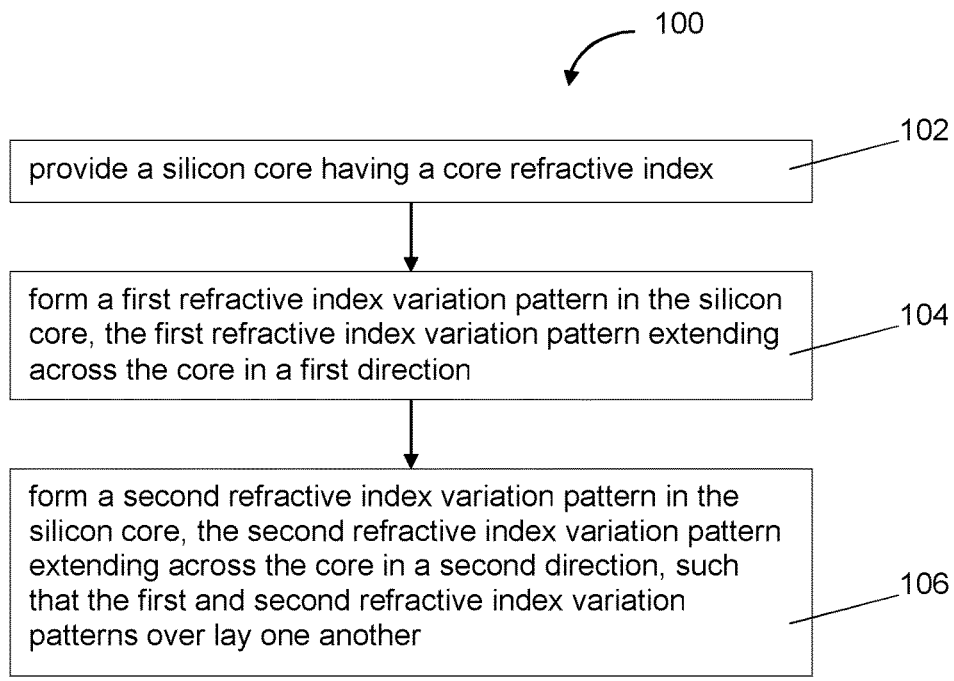
FIG. 8 shows the steps of a method according to a fifth embodiment of the invention of fabricating a silicon photonic device.

A fifth embodiment of the invention provides a method 100 of fabricating a silicon photonic device, having the steps shown in FIG. 8.

The method comprises:

providing a silicon core having a core refractive index 102;

forming a first refractive index variation pattern in the silicon core 104; and forming a second refractive index variation pattern in the silicon core 106.

The first refractive index variation pattern is formed to extend across the silicon core in a first direction and the first periodic refractive index variation has a first modulation depth. The second refractive index variation pattern is formed to across the core in a second direction, substantially orthogonal to the first direction. The second refractive index variation pattern has a second modulation depth, which is less than the first modulation depth. The first refractive index variation pattern and the second refractive index variation pattern overlay one another, to thereby form a three-dimensional structure.

The first refractive index variation pattern is formed only to support propagation of light having a TM mode between the first direction and a third direction, substantially orthogonal to the first direction and the second direction. The second refractive index variation pattern is formed only to support propagation of light having a TE mode between the second direction and the third direction.

Figure 9:
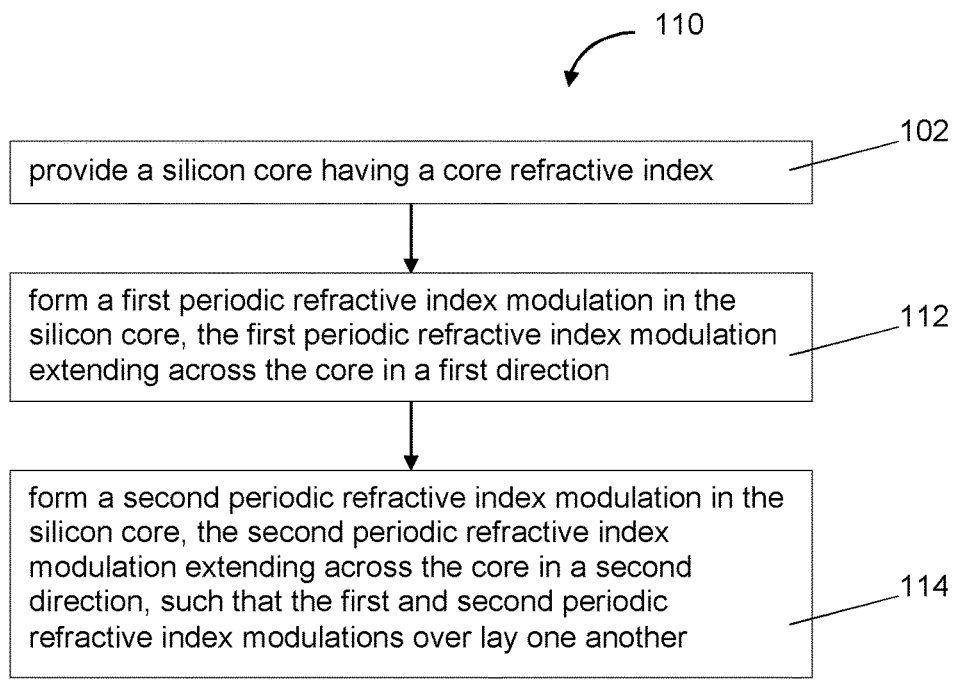
FIG. 9 shows the steps of a method according to a sixth embodiment of the invention of fabricating a silicon photonic device.

Referring to FIG. 9, a sixth embodiment of the invention provides a method 110 of fabricating a silicon photonic device which is similar to the method 100 of the previous embodiment, with the following modifications. The same reference numbers are retained for corresponding features.

In this embodiment, the first refractive index variation pattern is a first periodic refractive index modulation, which is formed extending across the core in the first direction 112. The first period refractive index modulation has a first grating period and the first modulation depth. The second refractive index variation pattern is a second periodic refractive index modulation, which is formed extending across the core the second direction 114. The second period refractive index modulation has a second grating period and the second modulation depth.

Figure 10:
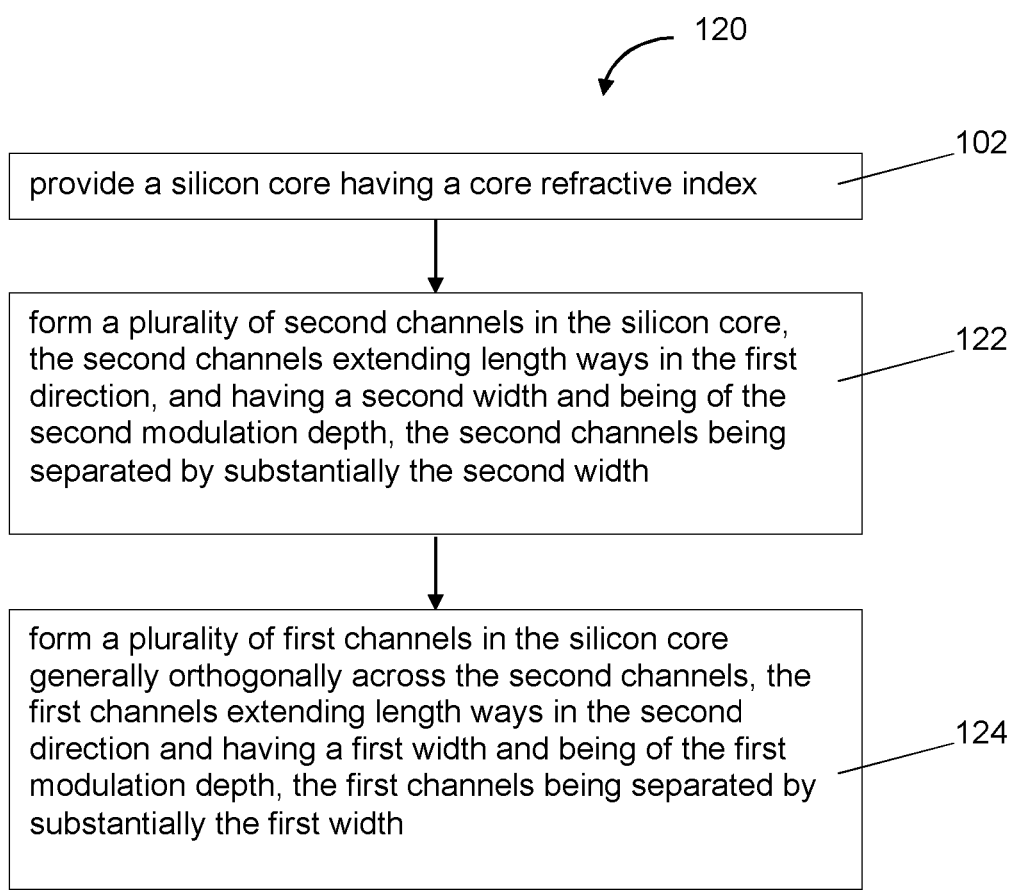
FIG. 10 shows the steps of a method according to a seventh embodiment of the invention of fabricating a silicon photonic device.

Referring to FIG. 10, a seventh embodiment of the invention provides a method 120 of fabricating a silicon photonic device which is similar to the method 100 of the fifth embodiment, with the following modifications. The same reference numbers are retained for corresponding features.

In this embodiment, the second refractive index variation pattern is formed first 122 and then the first refractive index variation pattern is formed generally orthogonally across the second refractive index variation pattern 124.

The periodic refractive index variation pattern is formed by forming a plurality of second channels in the silicon core. Each of the second channels extends length ways in the first direction and each of the second channels has a second width and is of the second modulation depth. Adjacent second channels are separated by the second width.

The first refractive index variation pattern is formed by forming a plurality of first channels in the silicon core. Each of the first channels extends length ways in the second direction and each of the first channels has a first width and is of the first modulation depth. Adjacent first channels are separated by the first width.

The first and second widths may be the same or they may be different.

Figure 11:
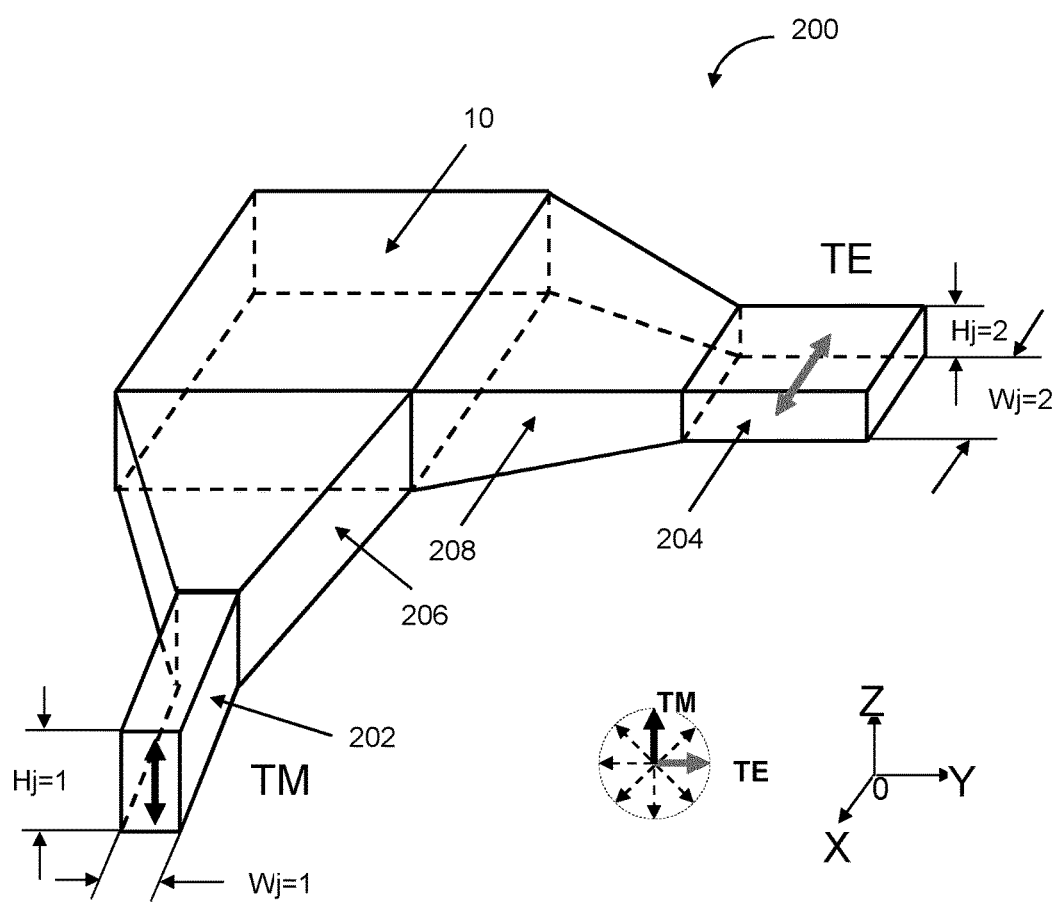
FIG. 11 is a diagrammatic representation of part of an optical polarisation beam coupler according to an eighth embodiment of the invention.

An eighth embodiment of the invention provides an optical polarisation beam coupler 200, as shown in FIG. 11. The optical polarisation beam coupler 200 comprises a silicon photonic device 10, as described above and shown in FIG. 1.

The optical polarisation beam coupler 200 comprises a first planar waveguide 202, a second planar waveguide 204, a first tapered planar waveguide 206 and a second tapered planar waveguide 208. For clarity, only the silicon core of the silicon photonic device 1 is shown. It will be understood by the skilled person that the silicon core will be provided on a silicon substrate and a silicon oxide under-cladding may be provided between the silicon core and the silicon substrate, and a silicon oxide over-cladding may be provided on top of the silicon core. Similarly, each of the planar waveguides 202, 204 and each of the tapered waveguides 206, 208 will be provided on a silicon substrate and a silicon oxide under-cladding may be provided between each waveguide and the silicon substrate, and a silicon oxide overcladding may be provided on top of each waveguide.

The first planar waveguide 202 has a width, $W_{j=1}$, and has a height, $H_{j=1}$, which is at least equal to the first modulation depth of the silicon photonic device 10. The width and the height of the first planar waveguide together cause the first planar waveguide only to support propagation of light having the TM mode.

The second planar waveguide 204 has a width, $W_{j=2}$, and has a height, $H_{j=2}$, which is at least equal to the second modulation depth of the silicon photonic device 10. The width and the height of the first planar waveguide together cause the first planar waveguide only to support propagation of light having the TM mode.

The first tapered planar waveguide 206 has a height at least equal to the height of the first planar waveguide. The second tapered planar waveguide 208 has a height at least equal to the height of the second planar waveguide. Each tapered planer waveguide has a wide end coupled to a respective side of the silicon photonic device and has a narrow end coupled to one end of the respective planar waveguide. The tapered waveguides act to smooth the mode field diameter, MFD, mismatch between the silicon photonic device and the respective planar waveguide 202, 204.

In use, a first optical signal, having the TM mode, input from the first direction, x, into the unattached end of the first planar waveguide 202 is coupled into the silicon photonic device 10 via the first tapered planar waveguide 204. The first optical signal interacts with the first periodic refractive index variation within the silicon photonic device 10 and is diffracted by the first periodic refractive index variation into the third direction, z. Similarly, a second optical signal, having the TE mode, input from the second direction, y, into the unattached end of the second planar waveguide 204 is coupled into the silicon photonic device 10 via the second tapered planar waveguide 208. The second optical signal interacts with the second periodic refractive index variation within the silicon photonic device 10 and is diffracted by the second periodic refractive index variation into the third direction, z. Two orthogonally polarised optical signals, TE mode and TM mode, can therefore be combined using the optical polarisation beam coupler 200.

The opposite operation may also be performed; an optical signal comprising polarisations, TE mode and TM mode, input into the silicon photonic device 10 from the third direction, z, will be split into a TM mode optical signal output through the first planar waveguide 202 to the first direction, x, and a TE mode optical signal output through the second planar waveguide 204 to the second direction, y.

Figure 12:
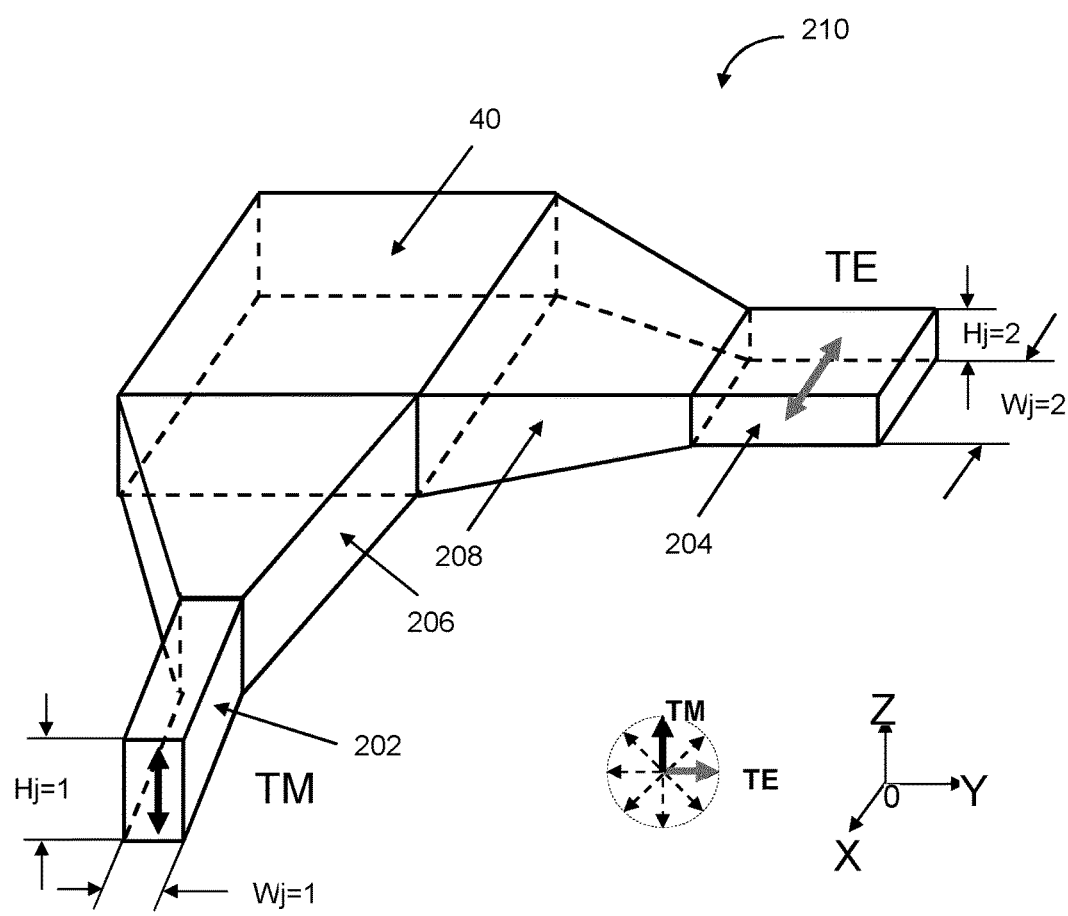
FIG. 12 is a diagrammatic representation of part of an optical polarisation beam coupler according to a ninth embodiment of the invention.

A ninth embodiment of the invention provides an optical polarisation beam coupler 210, as shown in FIG. 12. The optical polarisation beam coupler 210 of this embodiment is similar to the optical polarisation beam coupler 200 of the previous embodiment, with the following modifications. The same reference numbers are retained for corresponding features.

In this embodiment, the optical polarisation beam coupler 210 comprises a silicon photonic device 10, as described above and shown in FIG. 2. It will be appreciated that a silicon photonic device 20, 40 as shown in FIGS. 3 to 75 may alternatively be used.

The optical polarisation beam coupler 210 is formed as a complementary metal-oxide-semiconductor, CMOS, silicon photonic, SiPh, integrated device.

The surface area of the device 10 must be larger than the mode field diameter, MFD, of the combined polarisation beam or of an optical fibre coupled to the device for receipt/delivery of the combined polarisation beam. For example, if the laser beam is guided by a SMF with MFD of about 10 µm, the desired surface area may be of about 15×15 µm².

For both the first periodic refractive index modulation, TM (j=1), and the second periodic refractive index modulation, TE (j=2), the grating period Λj (j=1, 2), the wave number of incoming/outgoing beam, Koc=2πnoc/λ0, the angle at which the combined beam enter/leaves the grating structure, known as the off-vertical tilt angle, αj (j=1, 2) and propagation constant of the waveguide, βj=2πneff,j/λ0 (j=1, 2) are determined by the Bragg condition, given by:

$$Koc \sin \alpha j + m2\pi/\Lambda j = \beta j \quad (1)$$

where, noc is the refractive index of any over-cladding provided over the device, and λ0 is the wavelength of incoming/outgoing combined beam; m (m=±1, ±2, ... ) is the diffraction order of grating structure, neff,j (j=1, 2) is the effective refractive index of the planar waveguide which is a function of the width Wj and the height Hj of the waveguide for a given λ0. Mathematically, neff,j may be determined by the well-known numerical methods such as the finite difference method (FDM), the finite element method (FEM) and the film mode matching method (FMM).

Figure 13:
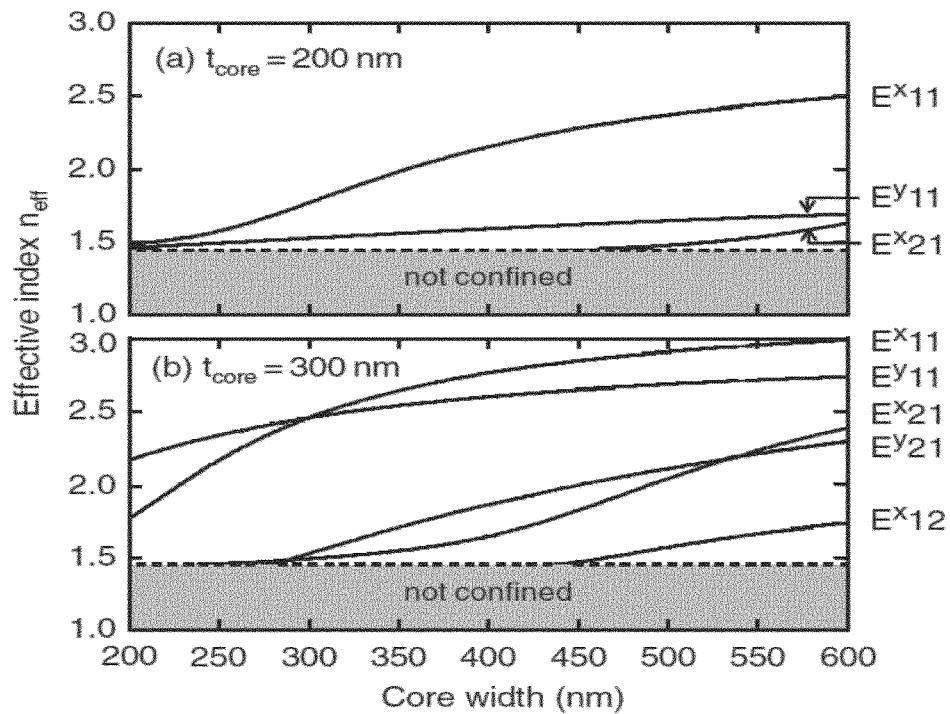
FIG. 13 illustrates the dependence of the silicon core width of a silicon photonic waveguide on its effective refractive index for two different heights ($t_{core}$) of silicon core.
Figure 14:
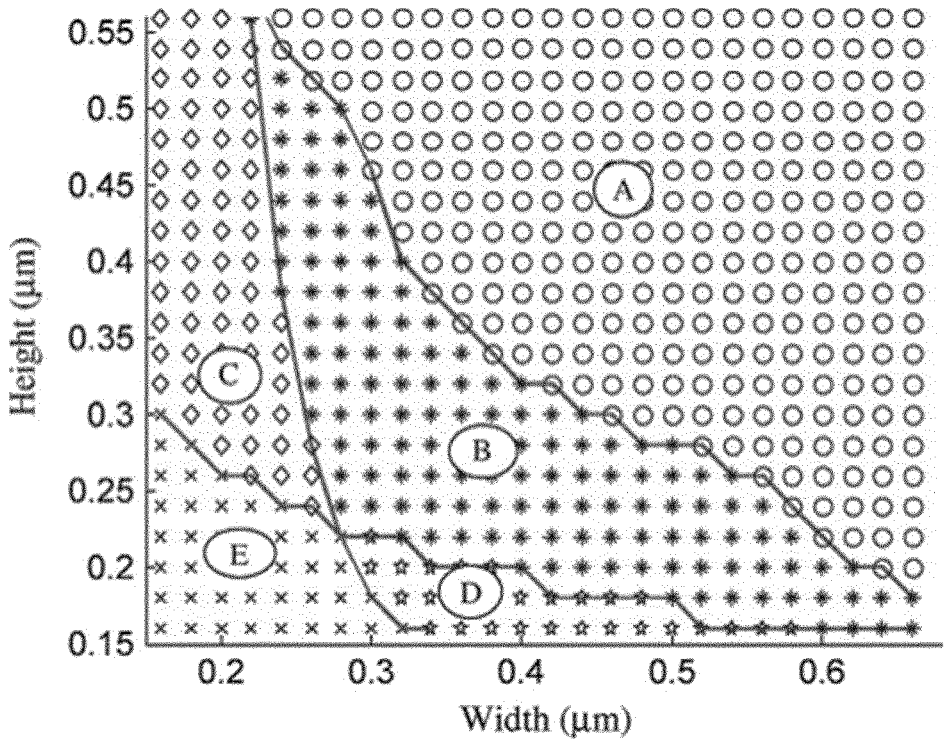
FIG. 14 shows modal characteristics of silicon nanophotonic waveguides with different width and height.

The dependence of neff,j on Wj is illustrated in FIGS. 13 and 14. FIG. 13 is extracted from "Silicon Photonics II, Components and Integration", edited by David J. Lockwood and Lorenzo Pavesi, 2011, and shows the dependence of neff,j on Wj for two different waveguide core geometries, of different heights; $t_{core}$ (i.e. Hj)=200 nm and 300 nm respectively. A wavelength of λ0=1550 nm is used for the calculation. One can see that it is possible to design a planar waveguide to only support propagation of a single mode, e.g. TE mode (EX11) or TM mode (Ey11). By carefully selecting neff,j, it is possible to extract a suitable set of geometry parameters, Wj×Hj, for a planar waveguide from this Figure and to select a suitable grating period, Λj, to effectively couple light into the corresponding planar waveguide.

As an example, we shall assume that one selects the same effective index neff, 1=neff, 2=2.25 for both TE(j=2) and TM(j=1) modes. From FIGS. 11a and 11b, the geometry for the second waveguide, for the TE mode, can be extracted as W2×H2≈450×200 nm² (FIG. 11a) and the geometry for the first waveguide, for the TM mode, can be extracted to be W1×H1≈225×300 nm² (FIG. 114b) respectively. Applying equation (1), the period of the silicon photonic device (Λj) of both the first periodic refractive index variation, TM mode, and the second periodic refractive index variation, TE mode, can be determined by:

$$\Lambda j = \lambda 0/(neff,j - noc \sin \alpha j) = 1550/(2.25 - 1.5 \sin \alpha j) \quad (2)$$

If we assume that the off-vertical tilt angle αj is small (0°<αj<10°) and we have the same angle for both TE and TM modes, one could get both Λ1 and Λ2 with a value of about 700 nm. One may optimize the design parameters of the planar waveguides and the silicon photonic device for TE and TM modes, separately.

FIG. 14 shows a similar graph, reported by Q. Wang et al, "Ultracompact TM-Pass Silicon Nanophotonic Waveguide Polarizer and Design", IEEE Photonics Journal, vol. 2, no. 1, February 2010, FIG. 2. In order to ensure propagation of only the fundamental TM mode, TM01, the first planar waveguide parameters must fall within region C, and to ensure propagation of only the fundamental TE mode, TE01, the second planar waveguide parameters must fall within region D. To confine a single TE mode in the second planar waveguide 204, in which the dominant electric field is parallel to x-axis, the width of core (Wj=2) must be much larger than the of height of core (Hj=2), e.g. Wj=2≈2Hj=2. On the other hand however, to confine a single TM mode in the first planar waveguide 202, in which the dominant electric field is parallel to z-axis, the width of the core (Wj=1) must be much smaller than the height of the core (Hj=1), e.g. Hj=1≈2Wj=1.

Figure 15:
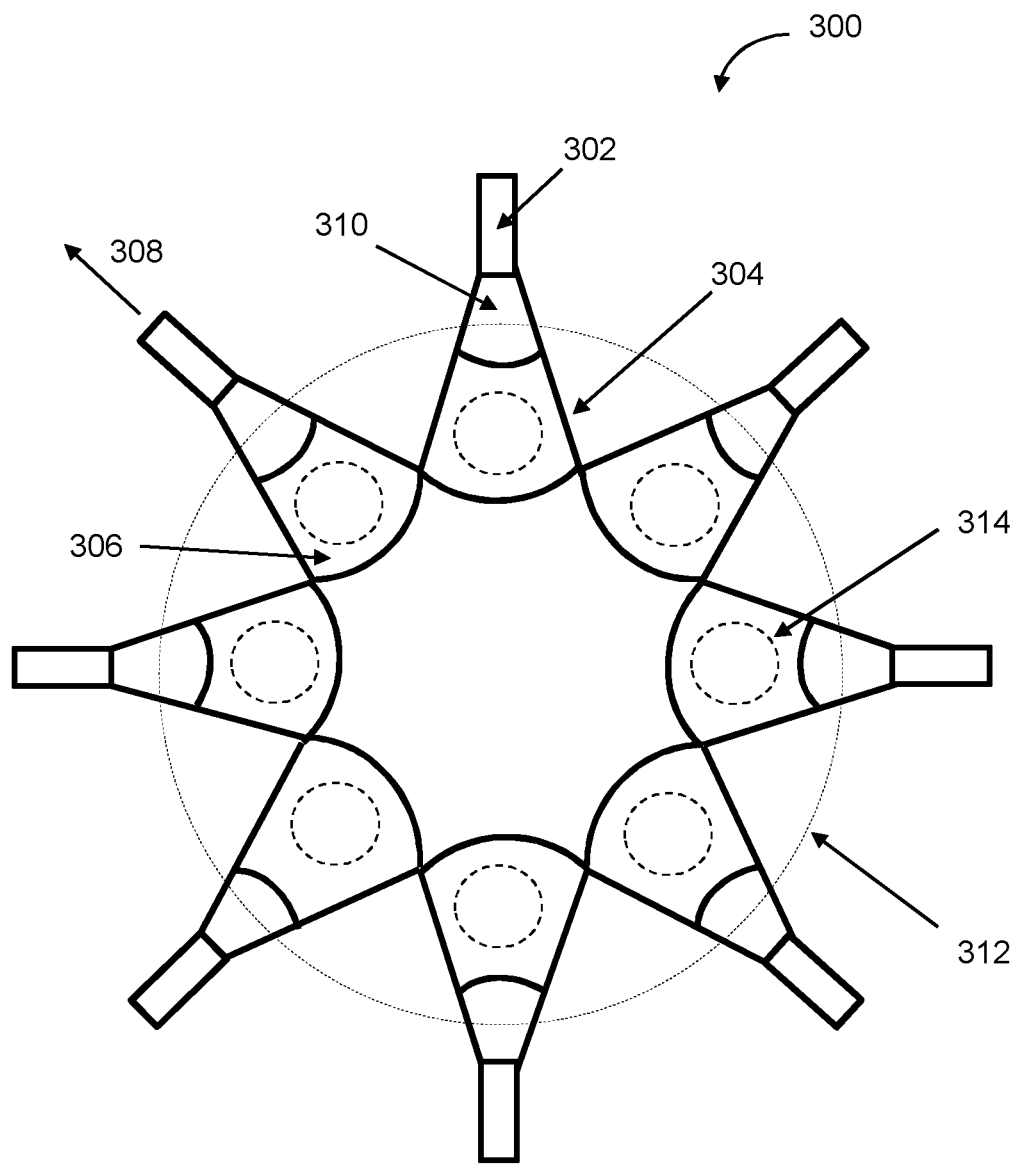
FIG. 15 is a diagrammatic plan view of an optical waveguide coupler according to a tenth embodiment of the invention.

Referring to FIG. 15, a tenth embodiment of the invention provides an optical waveguide coupler 300 comprising a plurality of planar waveguides 302, a plurality of silicon photonic diffractive gratings 304, and a plurality of tapered planar waveguides 310 each provided between a respective planar waveguide and a respective silicon photonic diffractive grating.

Each planar waveguide 302 has a respective width and a respective height which together cause each planar waveguide only to support propagation of light having a TE mode.

Each silicon photonic diffractive grating 304 comprises a planar silicon core 306 having a core refractive index and a grating structure formed in the silicon core. The grating structure comprises a periodic refractive index variation extending across the core generally in a respective first direction 308. The periodic refractive index variation has a grating period and a modulation depth, and the grating period and the modulation depth of each silicon photonic diffractive grating are selected to cause the respective grating only to support propagation of the light supported by the respective planar waveguide between the respective first direction and a third direction, substantially orthogonal to the planar silicon core.

There are eight silicon photonic diffractive gratings 304 in this embodiment, which are arranged generally adjacent one another in an octagon-like arrangement. It will be appreciated that a different number of gratings 304 may be used, for example five gratings 304 arranged in a pentagon-like arrangement, example six gratings 304 arranged in a hexagon-like arrangement, seven gratings 304 arranged in a heptagon-like arrangement, or nine gratings 304 arranged in a nonagon-like arrangement.

Each tapered planar waveguide 310 has a height at least equal to the height of the respective planar waveguide. Each tapered planar waveguide 310 has a wide end coupled to one end of the respective silicon photonic diffractive grating in the first direction and has a narrow end coupled to one end of the respective planar waveguide.

Each of the silicon photonic diffractive gratings 304 has a generally tapered shape. The end of each grating 304 which is coupled to the respective tapered planar waveguide has a first width and a generally curved shape. The opposite end of the grating 304 is wider and also has a generally curved shape. The grating structure comprises a plurality of core refractive index regions and a plurality of lower index regions. Each of the regions extends lengthways across the respective width of the silicon core and has a respective curved shape. Each region has a width of one half of the grating period. Each reduced index region comprises a silicon core layer and a grating layer of the modulation depth, which is less than the height of the silicon core. The grating layer comprises an optically transmissive medium having a lower refractive index than the core refractive index.

FIG. 15 also shows, in outline, the arrangement of a multi-core fibre, MCF, 312, which does not form part of this embodiment, with the optical waveguide coupler. The MCF is an eight-core MCF, comprising eight optical fibres each of which is coupled at one end to a respective one of the gratings 304. The MFD 314 of each fibre is shown in outline on each grating.

Figure 16:
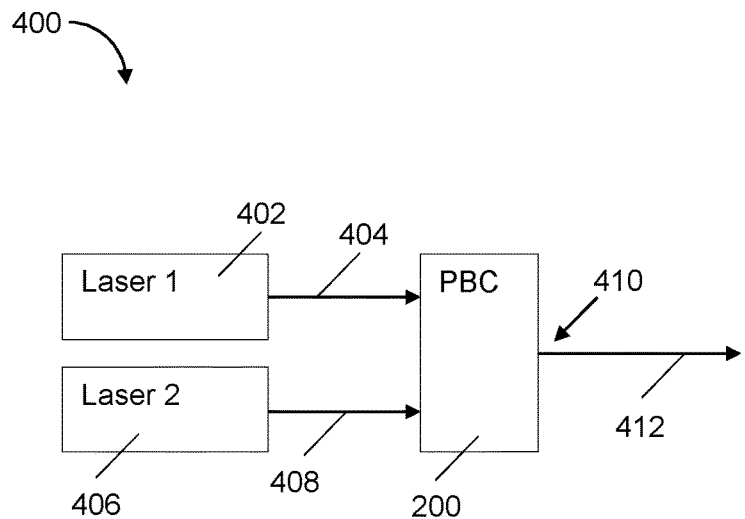
FIG. 16 is a schematic representation of an optical source according to an eleventh embodiment of the invention.

Referring to FIG. 16, an eleventh embodiment of the invention provides an optical source 400 comprising a first laser 402, a second laser 406, an optical polarisation beam coupler 200 and an output 410.

The first laser 402 is arranged to generate a first optical signal 404 having a first state of polarisation, SOP, and a first optical frequency. The second laser 406 is arranged to generate a second optical signal 408 having a second SOP and a second optical frequency. The second SOP is substantially orthogonal to the first SOP and the second optical frequency is different to the first optical frequency by a preselected frequency difference, $\Delta v$.

The optical polarisation beam coupler, PBC, 200 is as described above and shown in FIG. 11. The PBC 200 is arranged to combine the first optical signal and the second optical signal into a composite optical signal comprising both the first optical signal and the second optical signal. The resulting composite optical signal is therefore a dual-carrier optical signal. The output 410 is arranged to output the composite optical signal 412.

Figure 17:
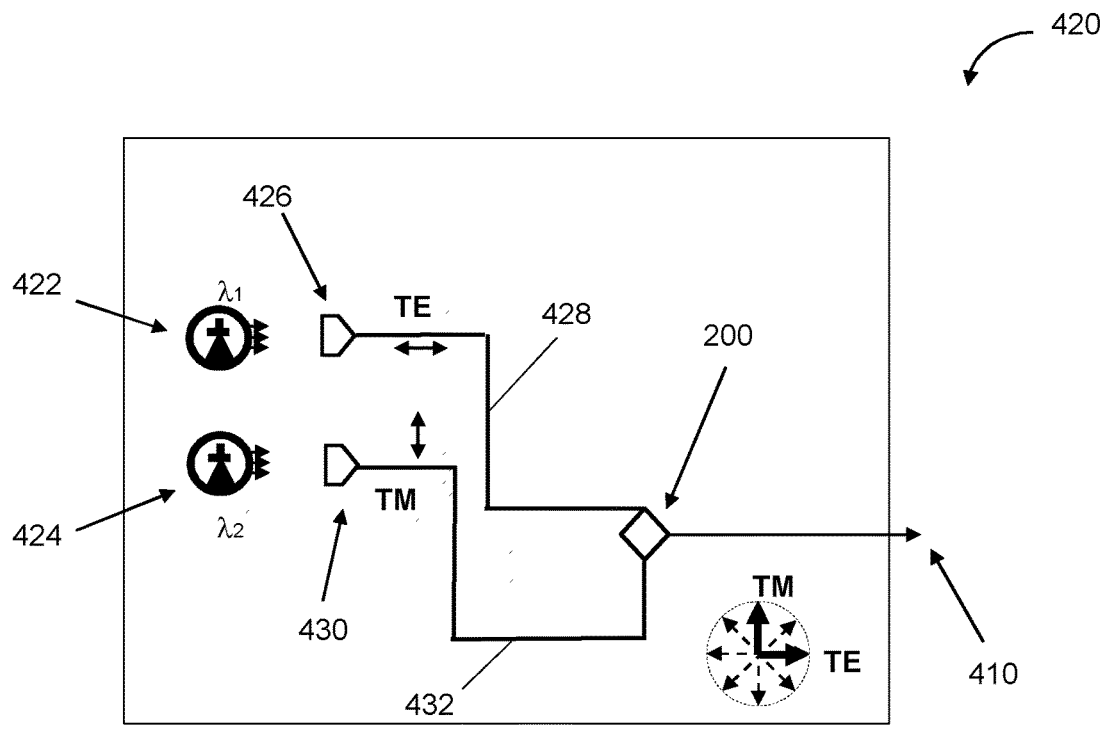
FIG. 17 is a schematic representation of an optical source according to a twelfth embodiment of the invention.

Referring to FIG. 17, a twelfth embodiment of the invention provides an optical source 420 which is similar to the optical source 400 of the previous embodiment, with the following modifications. The same reference numbers are retained for corresponding features.

The first laser 422 is arranged to generate a first optical signal having a first optical frequency (wavelength, $\lambda_1$) The first laser is coupled to the PBC 200 through a first single polarisation grating coupler 426 and a first waveguide 428. The first single polarisation grating coupler is configured for the TE mode, SPGC-TE, therefore the first optical signal is delivered to the polarising beam coupler having a first state of polarisation, the TE mode. The second laser 424 is arranged to generate a second optical signal having a second optical frequency, (wavelength, $\lambda_2$), offset from the first optical frequency by a frequency difference, $\Delta v$, of 25 GHz. The second laser is coupled to the PBC 200 through a second single polarisation grating coupler 430 and a second waveguide 432. The second single polarisation grating coupler is configured for the TM mode, SPGC-TM, therefore the second optical signal is delivered to the polarising beam coupler having a second state of polarisation, the TM mode.

The optical polarisation beam coupler 200 is as described above and shown in FIG. 11. It will be appreciated that the optical polarisation beam coupler 210 described above and shown in FIG. 12 may alternatively be used. The optical polarisation beam coupler is arranged to combine the TE mode signal and the TM mode signal into a composite optical signal comprising both modes. The output 406 is arranged to output the composite optical signal.

Figure 18:
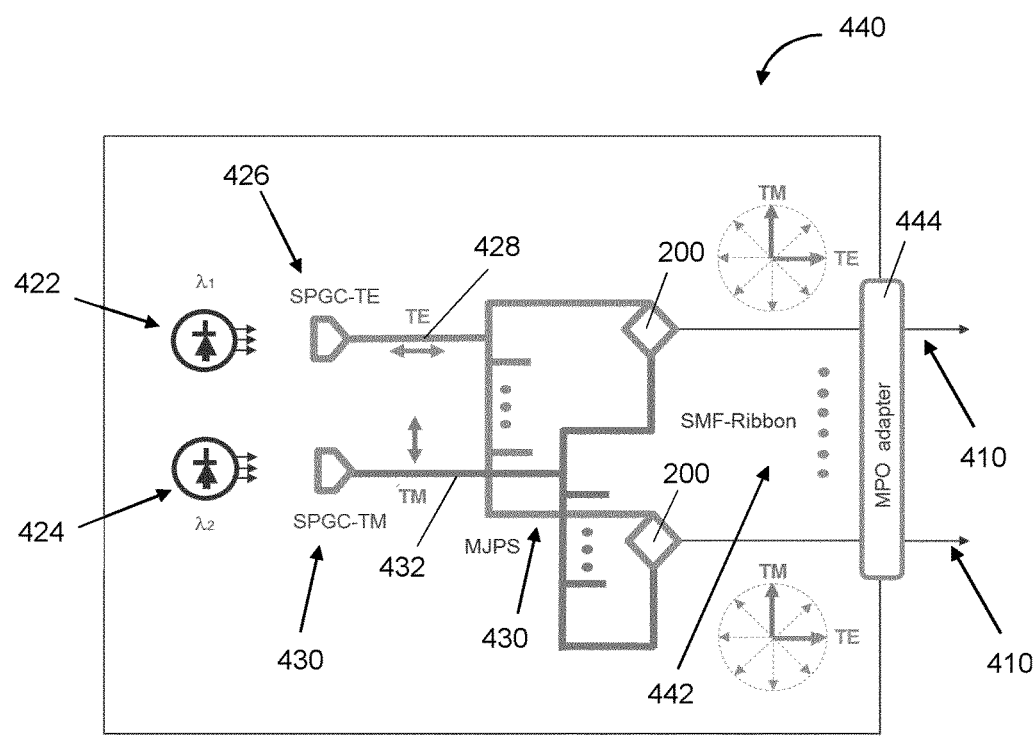
FIG. 18 is a schematic representation of an optical source according to a thirteenth embodiment of the invention.

A thirteenth embodiment of the invention provides an optical source 440, as shown in FIG. 18. The optical source 440 of this embodiment is similar to the optical source 420 of the previous embodiment, shown in FIG. 17, with the following modifications. The same reference numbers are retained for corresponding features.

The optical source 440 of this embodiment takes the form of a CMOS silicon photonic, SiPh, integrated circuit. The optical source 440 comprises a plurality of optical polarisation beam couplers 200, each of which is connected to the SPGC-TE 426 and the SPGC-TM 430 through a multiple-junction power splitter, MJPS, 430 and respective waveguides 428, 432. The output of each optical polarisation beam coupler 200 is coupled to a respective single mode fibre, SMF, in an SMF ribbon 442 and a multi-fibre push-on, MPO, adapter 444. The SPGC-TE and SPGC-TM couple the two optical signals with TE and TM modes into the waveguides 428, 432, which are silicon photonic wire waveguides. The silicon photonic wire waveguides not only interconnect the SiPh devices, SPGC-TE, SPGC-TM, MJPS and the optical polarisation beam coupler, but also provide confinement of the optical signals for single mode propagation. The SiPh devices and the waveguides are provided as an integrated circuit which may be manufactured using the well-known CMOS industry standardized processes compatible with the so-called silicon-on-insulator, SOI, wafer flow platform using a standard CMOS production infrastructure.

Each laser 422, 424 is a high power transmitter module, typically a distributed feedback, DFB, laser. The lasers 422, 424 may be directly integrated into the CMOS photonic die or may be assembled as an external light source but co-packaged with CMOS photonic integrated circuit. Where the lasers are external, they have a polarization maintaining fibre, PMF, pigtail for transverse mode pre-selection and beam guidance into the optical polarisation beam coupler. The laser beams output by the two lasers are collimated and directed onto the grating surface of the SPGC-TE and SPGC-TM respectively at a small tilt angle $\alpha j$ (e.g. $\alpha j$<100) to the normal. The wavelength of each laser is selected from one of the SMF transmission windows (e.g. O, E, S, C, L and U bands). The frequency offset between the two optical signals is about 25 GHz.

The SPGC-TE 426 and the SPGC-TM 430 are each a passive CMOS silicon photonic device, and typically comprise 3 major functional parts: a one-dimensional diffractive grating; a single-mode silicon photonic waveguide; and a tapered silicon photonic waveguide provided between the one-dimensional grating and the waveguide. The taper is used to smooth the significant MFD-mismatch between the width of grating, which here is 15 μm, and the width of waveguide Wj, typically a few hundred nm only.

Figure 19:
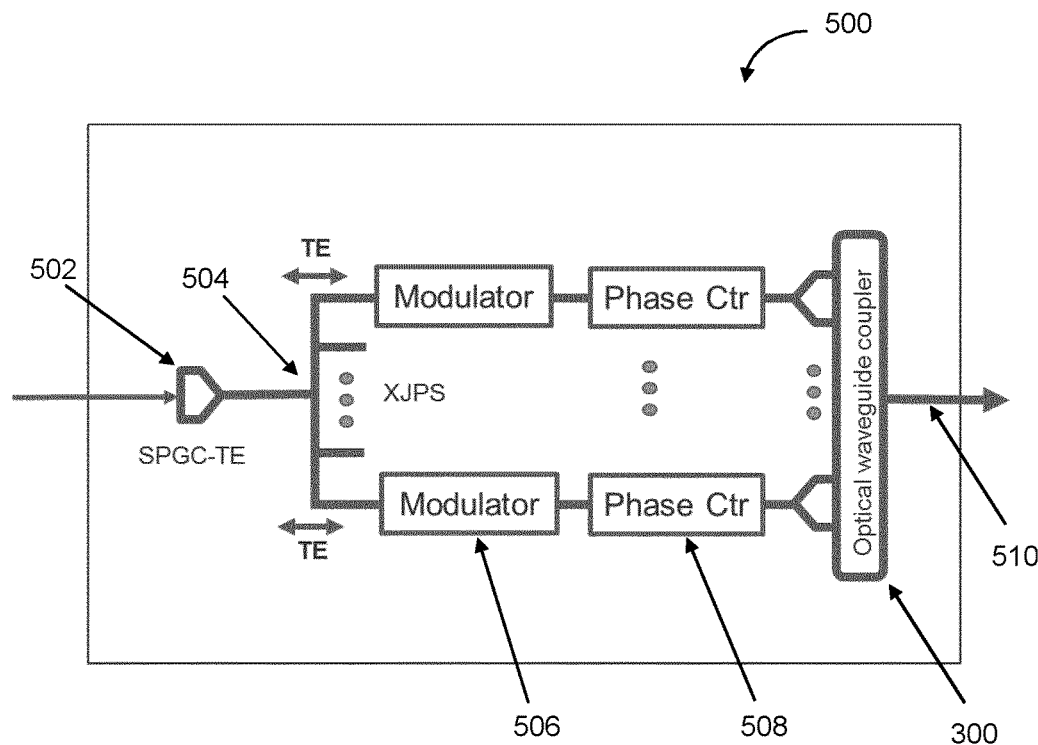
FIG. 19 is a schematic representation of a communications network base station node according to a fourteenth embodiment of the invention.

Referring to FIG. 19, a fourteenth embodiment of the invention provides a communications network base station node 500 comprising an optical waveguide coupler 300 as described above and shown in FIG. 15. The communications network base station node 500 additionally comprises a single polarisation grating coupler 502 configured to couple TE mode optical signals, SPGC-TE, a multiple cross-junction power splitter, XJPS, 504, eight optical modulators 506, eight phase controllers 508 and an output eight-core MCF 510.

The SPGC-TE selects a TE mode optical signal from an input optical signal, and the TE mode optical signal is then split eight ways by the XJPS. The TE mode optical signals output from each of the phase controllers 508 are coupled into the respective silicon photonic diffractive grating 304 of the optical waveguide coupler 300.

Figure 20:
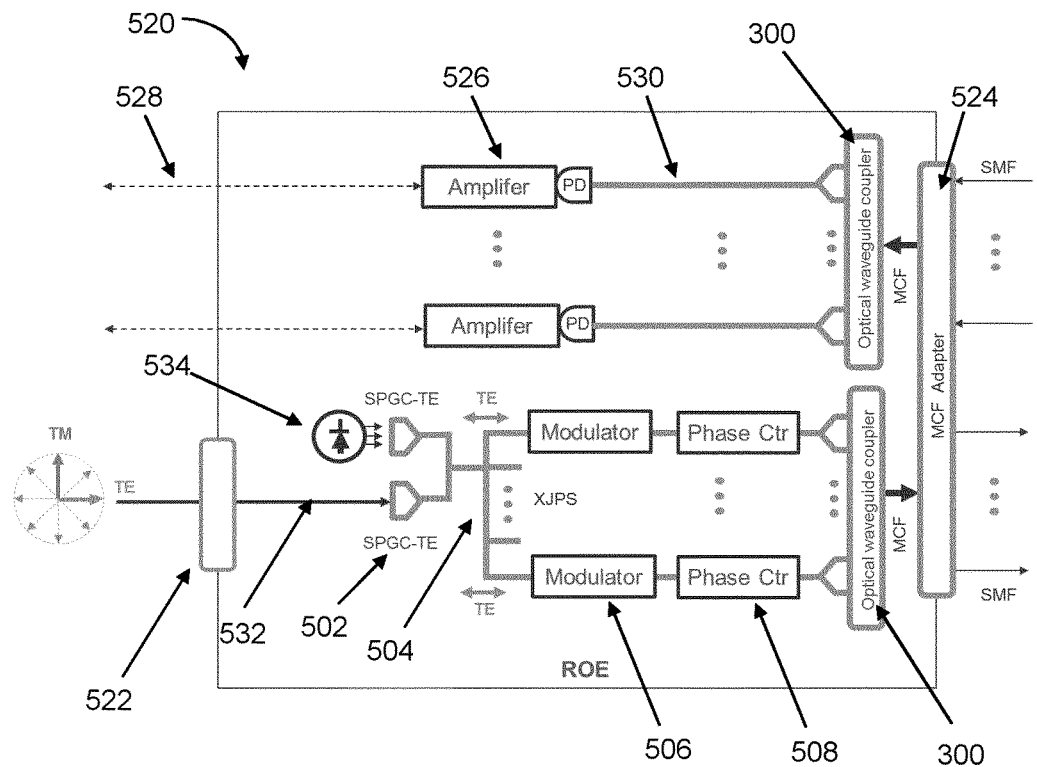
FIG. 20 is a schematic representation of a communications network base station node according to a fifteenth embodiment of the invention.

A fifteenth embodiment of the invention provides a communications network base station node 520, as shown in FIG. 20. The base station node 520 of this embodiment takes the form of a remote optical engine, ROE, and is similar to the base station node 500 of the previous embodiment, with the following modifications.

The ROE 520 is provided as an SiPh integrated circuit and comprises an input 522, a pair of SPGC-TE 502, each having an SMF or polarising fibre, PZF pigtail, a multiple cross-junction power splitter, XJPS 504, eight optical modulators each followed by a phase controller 508, two optical waveguide couplers 300, each having a multicore fibre, MCF, pigtail, an MCF-adapter 524 that provides an interface for optical signals in/out of the ROE, eight photodiodes followed by amplifiers 526, copper (Cu) wiring 528 to transmit output electrical signals, and many SiPh waveguides 530 which provide interconnections between the various SiPh devices.

The input 522 is arranged to receive an input optical signal. Here the input takes the form of an SMF adapter arranged to receive a generically polarised optical signal. An SMF 532 connects the SMF-adapter to the SPGC-TE 502. The SPGC-TE selects the TE mode of the generically polarised optical signal to form a polarised optical signal having the TE mode. Alternatively, the unwanted modes, e.g. the high order TE modes and TM modes, may be removed using a relatively long length of waveguide. To make the ROE SiPh integrated circuit more compact, and to achieve a high quality of signal modulation, a pre-filter to recover the highly and linearly polarized beam may be used. This may be achieved by replacing the SMF 532 with polarising fibre, PZF, to function as a fibre in-line polarizer.

This embodiment additionally comprises an integrated CW laser 534, which is provided to increase flexibility of deployment of the ROE. For example, if the ROE is operated at a normal operation temperature, for example 0-700 C, or is in a climate controlled environment, the CW laser may be used rather than receiving a generically polarised optical signal from a remote light source. This may simplify system deployment and save energy. The integrated CW laser may also provide protection of the ROE in the case where a remote light source providing the generically polarised optical signal fails or becomes redundant. It will be appreciated that inclusion of a CW laser is optional.

Figure 21:
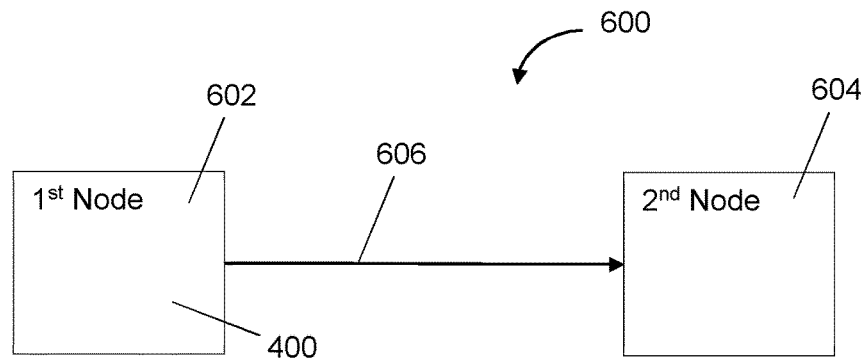
FIG. 21 is a schematic representation of a communications network light source system according to a sixteenth embodiment of the invention.

A sixteenth embodiment of the invention provides a communications network light source system 600 as shown in FIG. 21. The light source system 600 comprises a first node 602, a second node 604 and an optical link 606.

The first node comprises an optical source 400 as described above and shown in FIG. 16. It will be appreciated that either of the optical sources 420, 440 described above and shown in FIGS. 17 and 18 may alternatively be used. The first node is provided at a first location and is climate controlled.

The second node 604 comprises an optical waveguide coupler 300 as described above and shown in FIG. 15. The second node is provided at a second location, remote from the first location. The second node is not climate controlled.

The optical link 606 is provided between the first node and the second node and is arranged to deliver the composite optical signal output by the optical source to the second node. The light source system 600 may therefore be described as a remote light source system.

Figure 22:
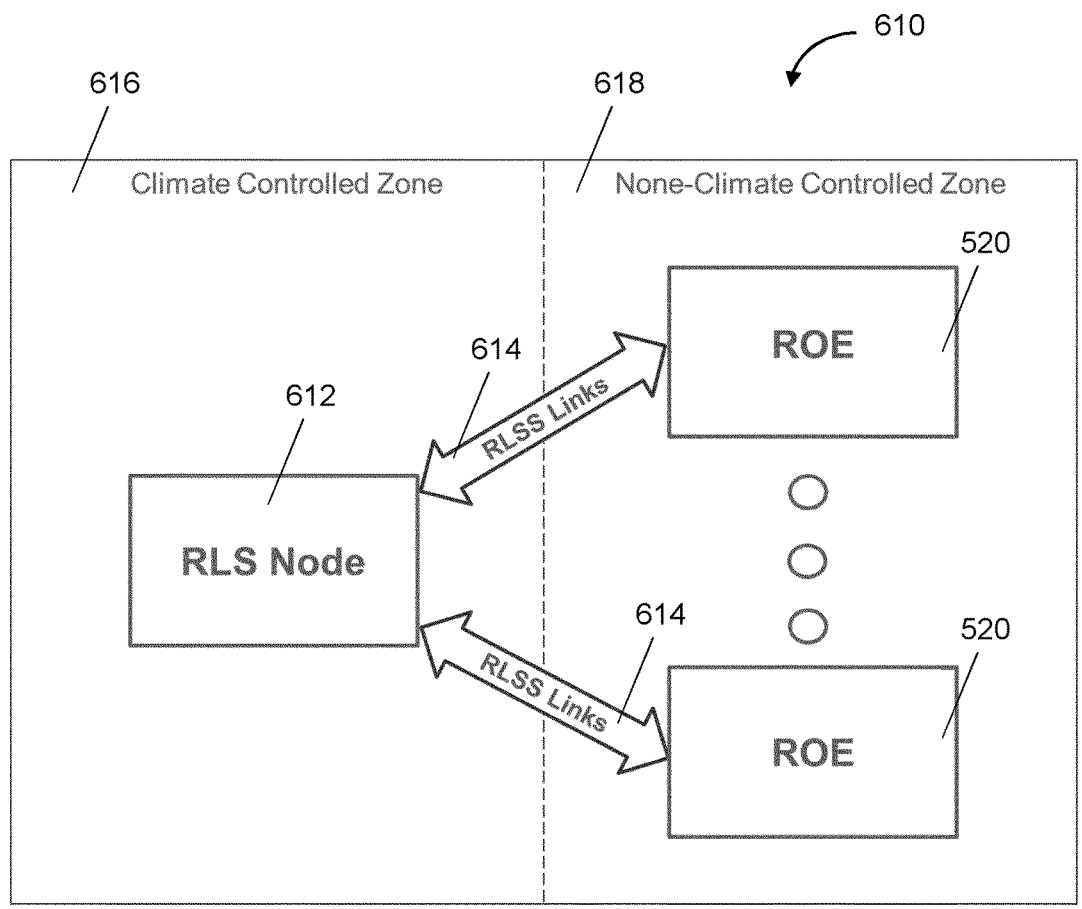
FIG. 22 shows a remote light source system according to a seventeenth embodiment of the invention.

FIG. 22 shows a remote light source system, RLSS, 610 according to a seventeenth embodiment of the invention. The RLSS 610 comprises a first node, the remote light source, RLS, node 612, a plurality of second nodes, remote optical engines, ROE, 520, and a plurality of optical links, RLSS links 614.

The RLS node 612 comprises an optical source 440 as described above and shown in FIG. 18. The RLS node 612 is provided within a climate controlled zone 616. This can take the form of climate control apparatus provided within the RLS node itself or the RLS node being located within a climate controlled environment.

Each ROE 520 is as described above and shown in FIG. 20. It will be appreciated that a communications network base station node 500 as shown in FIG. 19 may alternatively be used.

Each RLSS link 614 comprises a feeder optical fibre coupled at one end to the output 410 of the optical source 440 and coupled at the other end to the input 522 of the ROE 520. Each feeder optical fibre has a polarisation mode dispersion, PMD, coefficient and a length. The preselected frequency difference, $\Delta v$, is inversely proportional to a differential group delay, DGD, $\tau$, which each composite optical signal is expected to experience on transmission along a feeder fibre. The DGD that the composite optical signal will experience is proportional to the PMD coefficient and the length of the feeder optical fibre 614. At the output of the feeder optical fibre the orthogonality relation between the two optical signal components within the composite optical signal is maintained if the PMD of the feeder fibre does not exceed a given parameter, which can be estimated from the PMD coefficient and length of the feeder fibre.

The invention claimed is:

1. A silicon photonic device comprising:
a silicon core having a core refractive index; and
a structure formed in the silicon core, the structure comprising:
a first refractive index variation pattern extending across the core in a first direction, the first refractive index variation pattern having a first modulation depth; and
a second refractive index variation pattern extending across the core in a second direction, substantially orthogonal to the first direction, the second refractive index variation pattern having a second modulation depth, less than the first modulation depth,
wherein the first refractive index variation pattern overlays the second refractive index variation pattern, thereby forming a three-dimensional structure, and
wherein the first refractive index variation pattern only supports propagation of light having a transverse magnetic mode between the first direction and a third direction, substantially orthogonal to the first direction and the second direction, and the second refractive index variation pattern only supports propagation of light having a transverse electric mode between the second direction and the third direction.

2. The silicon photonic device of claim 1, wherein:
the structure is a diffractive grating structure and the first refractive index variation pattern is a first periodic refractive index modulation extending across the core in the first direction, the first periodic refractive index modulation having a first grating period and the first modulation depth;
the second refractive index variation pattern is a second periodic refractive index modulation extending across the core in the second direction, the second periodic refractive index modulation having a second grating period and the second modulation depth;
the three-dimensional structure is a three-dimensional grating structure; and
the first grating period and the first modulation depth together cause the device only to support propagation of light having a transverse magnetic mode between the first direction and a third direction, substantially orthogonal to the first direction and the second direction, and the second grating period and the second modulation depth together cause the device only to support propagation of light having a transverse electric mode between the second direction and the third direction.

3. The silicon photonic device of claim 2, wherein the silicon core has a length in the second direction, a width in the first direction and a height in the third direction and wherein the three-dimensional grating structure comprises:
a plurality of first regions each having the length of the silicon core and a width substantially equal to one half of the first grating period, and each comprising a silicon core layer and a grating layer being of the first modulation depth, which is less than the height of the silicon core, and the grating layer comprising an optically transmissive medium having a lower refractive index than the core refractive index; and
a plurality of second regions each having the length of the silicon core and a width substantially equal to one half of the first grating period, and each comprising a silicon core layer and a grating layer comprising a plurality of high index grating regions and a plurality of low index grating regions arranged in an alternating series, each of the grating regions having a length substantially equal to one half of the second grating period, and the high index grating regions being formed of the silicon core and the low index grating regions comprising an optically transmissive medium having a lower refractive index than the core refractive index, and
wherein the first regions and the second regions are arranged in an alternating series across the width of the silicon core in the first direction.

4. The silicon photonic device of claim 3, wherein each first region comprises a region of the silicon core etched to the first modulation depth and wherein each low index grating region of each second region comprises a region of the silicon core etched to the second modulation depth.

5. The silicon photonic device of claim 1, wherein:
the first refractive index variation pattern comprises a plurality of first channels formed in the silicon core, the first channels extending length ways in the second direction and the first channels having a first width and being separated by substantially the first width, and the first channels being of the first modulation depth; and
the second refractive index variation pattern comprises a plurality of second channels formed in the silicon core, the second channels extending length ways in the first direction generally orthogonally across the first channels, and the second channels having a second width and being separated by substantially the second width, and the second channels being of the second modulation depth.

6. An optical polarization beam coupler comprising:
the silicon photonic device of claim 1;
a first planar waveguide having a width and having a height at least equal to the first modulation depth, the width and the height of the first planar waveguide together causing the first planar waveguide only to support propagation of light having the transverse magnetic mode;
a second planar waveguide having a width and having a height at least equal to the second modulation depth, the width and the height of the second planar waveguide together causing the second planar waveguide only to support propagation of light having the transverse electric mode;
a first tapered planar waveguide having a height at least equal to the height of the first planar waveguide and having a wide end coupled to a first side of the silicon photonic device in the first direction and having a narrow end coupled to one end of the first planar waveguide; and
a second tapered planar waveguide having a height at least equal to the height of the second planar waveguide and having a wide end coupled to a second side of the silicon photonic device in the second direction and having a narrow end coupled to one end of the second planar waveguide.

7. The optical polarization beam coupler of claim 6, wherein the height of the first planar waveguide is greater than the width of the first planar waveguide and the height of the second planar waveguide is less than the width of the second planar waveguide, and wherein the first modulation depth is not greater than the height of the first planar waveguide and the second modulation depth is not greater than the height of the second planar waveguide.

8. A method of fabricating a silicon photonic device, the method comprising:
providing a silicon core having a core refractive index;
forming a first refractive index variation pattern in the silicon core, the first refractive index variation pattern extending across the core in a first direction and the first periodic refractive index variation having a first modulation depth;
forming a second refractive index variation pattern in the silicon core, the second refractive index variation pattern extending across the core in a second direction, substantially orthogonal to the first direction, and the second refractive index variation pattern having a second modulation depth, less than the first modulation depth,
wherein the first refractive index variation pattern and the second refractive index variation pattern overlay one another, thereby forming a three-dimensional structure, and
wherein the first refractive index variation pattern only supports propagation of light having a transverse magnetic mode between the first direction and a third direction, substantially orthogonal to the first direction and the second direction, and the second refractive index variation pattern only supports propagation of light having a transverse electric mode between the second direction and the third direction.

9. The method of claim 8, wherein the first refractive index variation pattern is a first periodic refractive index modulation formed extending across the core in the first direction, the first periodic refractive index modulation having a first grating period and the first modulation depth;
the second refractive index variation pattern is a second periodic refractive index modulation formed extending across the core in the second direction, the second periodic refractive index variation having a second grating period and the second modulation depth;
the three-dimensional structure is a three-dimensional grating structure; and
the first grating period and the first modulation depth together cause the device only to support propagation of light having a transverse magnetic mode between the first direction and a third direction, substantially orthogonal to the first direction and the second direction, and the second grating period and the second modulation depth together cause the device only to support propagation of light having a transverse electric mode between the second direction and the third direction.

10. The method of claim 8, wherein the first refractive index variation pattern is formed by forming a plurality of first channels in the silicon core, the first channels extending length ways in the second direction and having a first width and being of the first modulation depth, the first channels being separated by substantially the first width, and the second refractive index variation pattern is formed by forming a plurality of second channels in the silicon core, the second channels extending length ways in the first direction, and the second channels having a second width and being of the second modulation depth, the second channels being separated by substantially the second width.

11. An optical waveguide coupler comprising:
a plurality of planar waveguides each having a respective width and a respective height which together cause each planar waveguide only to support propagation of light having one of a transverse magnetic mode and a transverse electric mode;
a plurality of silicon photonic diffractive gratings each comprising:
a planar silicon core having a core refractive index; and
a grating structure formed in the silicon core, the grating structure comprising:
a periodic refractive index variation extending across the core generally in a respective first direction, the periodic refractive index variation having a grating period and a modulation depth, wherein the grating period and the modulation depth of each silicon photonic diffractive grating are selected to cause the respective grating only to support propagation of said light supported by the respective one of the planar waveguides between the respective first direction and a third direction, substantially orthogonal to the planar silicon core; and
a plurality of tapered planar waveguides each provided between a respective planar waveguide and a respective silicon photonic diffractive grating, and each tapered planar waveguide having a height at least equal to the height of the respective planar waveguide and having a wide end coupled to a one end of the respective silicon photonic diffractive grating in the first direction and having a narrow end coupled to one end of the respective planar waveguide.

12. The optical waveguide coupler of claim 11, wherein the silicon photonic diffractive gratings are arranged generally adjacent one another in a generally circular arrangement, and each respective tapered planar waveguide and planar waveguide extends generally outwardly away from the silicon photonic diffractive gratings.

13. The optical waveguide coupler of claim 12, wherein the silicon photonic diffractive gratings are arranged generally adjacent one another in one of a pentagon-like, hexagon-like, heptagon-like, octagon-like and nonagon-like arrangement.

14. The optical waveguide coupler of claim 11, wherein the silicon core of each of the silicon photonic diffractive gratings has a generally tapered shape and wherein the said one end of the silicon core has a first width and has a generally curved shape and an opposite end of the silicon core has a second width, greater than the first width, and has a generally curved shape, and wherein grating structure comprises a plurality of core refractive index regions and a plurality of lower index regions, each of the regions extending lengthways across the respective width of the silicon core and having a respective curved shape and each region having a width substantially equal to one half of the grating period, and wherein each reduced index region comprises a silicon core layer and a grating layer of the modulation depth, which is less than a height of the silicon core, and the grating layer comprising an optically transmissive medium having a lower refractive index than the core refractive index.

15. A communications network base station node comprising an optical waveguide coupler as claimed in claim 11.

16. A communications network light source system comprising:
a first node comprising an optical source;
a second node comprising an optical waveguide coupler; and
an optical link provided between the first node and the second node and arranged to deliver the composite optical signal output by the optical source to the second node,
wherein the first node is provided at a first location and the second node is provided at a second location, different to the first location, the first node being climate controlled and the second node not being climate controlled;
wherein the optical source comprises:
a first laser arranged to generate a first optical signal having a first state of polarization and a first optical frequency;
a second laser arranged to generate a second optical signal having a second state of polarization, substantially orthogonal to the first state of polarization, and having a second optical frequency, different to the first optical frequency by a preselected frequency difference, $\Delta v$;
an optical polarization beam coupler, the optical polarization beam coupler arranged to combine the first optical signal and the second optical signal into a composite optical signal comprising both the first optical signal and the second optical signal having said substantially orthogonal states of polarization; and
an output arranged to output the composite optical signal; and
wherein the optical polarization beam coupler comprises
a silicon photonic device;
a first planar waveguide having a width and having a height at least equal to the first modulation depth, the width and the height of the first planar waveguide together causing the first planar waveguide only to support propagation of light having the transverse magnetic mode;
a second planar waveguide having a width and having a height at least equal to the second modulation depth, the width and the height of the second planar waveguide together causing the second planar waveguide only to support propagation of light having the transverse electric mode;
a first tapered planar waveguide having a height at least equal to the height of the first planar waveguide and having a wide end coupled to a first side of the silicon photonic device in the first direction and having a narrow end coupled to one end of the first planar waveguide; and
a second tapered planar waveguide having a height at least equal to the height of the second planar waveguide and having a wide end coupled to a second side of the silicon photonic device in the second direction and having a narrow end coupled to one end of the second planar waveguide;
wherein the silicon photonic device comprises:
a silicon core having a core refractive index; and
a structure formed in the silicon core, the structure comprising:
a first refractive index variation pattern extending across the core in a first direction, the first refractive index variation pattern having a first modulation depth; and
a second refractive index variation pattern extending across the core in a second direction, substantially orthogonal to the first direction, the second refractive index variation pattern having a second modulation depth, less than the first modulation depth, wherein the first refractive index variation pattern overlays the second refractive index variation pattern, thereby forming a three-dimensional structure, and wherein the first refractive index variation pattern only supports propagation of light having a transverse magnetic mode between the first direction and a third direction, substantially orthogonal to the first direction and the second direction, and the second refractive index variation pattern only supports propagation of light having a transverse electric mode between the second direction and the third direction; and wherein the optical waveguide coupler comprises:

a plurality of planar waveguides each having a respective width and a respective height which together cause each planar waveguide only to support propagation of light having one of a transverse magnetic mode and a transverse electric mode;

a plurality of silicon photonic diffractive gratings each comprising:

a planar silicon core having a core refractive index; and a grating structure formed in the silicon core, the grating structure comprising:

a periodic refractive index variation extending across the core generally in a respective first direction, the periodic refractive index variation having a grating period and a modulation depth, wherein the grating period and the modulation depth of each silicon photonic diffractive grating are selected to cause the respective grating only to support propagation of said light supported by the respective one of the planar waveguides between the respective first direction and a third direction, substantially orthogonal to the planar silicon core; and a plurality of tapered planar waveguides each provided between a respective planar waveguide and a respective silicon photonic diffractive grating, and each tapered planar waveguide having a height at least equal to the height of the respective planar waveguide and having a wide end coupled to a one end of the respective silicon photonic diffractive grating in the first direction and having a narrow end coupled to one end of the respective planar waveguide.

17. The communications network light source system of claim 16, wherein the optical link comprises a feeder optical fibre coupled at one end to the output of the optical source and having a polarization mode dispersion coefficient and a length, and wherein the preselected frequency difference, $\Delta v$ is inversely proportional to a differential group delay, $\tau$, which is proportional to the polarization mode dispersion coefficient and the length of the feeder optical fibre.

18. An optical source comprising:

a first laser arranged to generate a first optical signal having a first state of polarization and a first optical frequency;

a second laser arranged to generate a second optical signal having a second state of polarization, substantially orthogonal to the first state of polarization, and having a second optical frequency, different to the first optical frequency by a preselected frequency difference, $\Delta v$;

an optical polarization beam coupler, the optical polarization beam coupler arranged to combine the first optical signal and the second optical signal into a composite optical signal comprising both the first optical signal and the second optical signal having said substantially orthogonal states of polarization; and an output arranged to output the composite optical signal;

wherein the optical polarization beam coupler comprises a silicon photonic device;

a first planar waveguide having a width and having a height at least equal to the first modulation depth, the width and the height of the first planar waveguide together causing the first planar waveguide only to support propagation of light having the transverse magnetic mode;

a second planar waveguide having a width and having a height at least equal to the second modulation depth, the width and the height of the second planar waveguide together causing the second planar waveguide only to support propagation of light having the transverse electric mode;

a first tapered planar waveguide having a height at least equal to the height of the first planar waveguide and having a wide end coupled to a first side of the silicon photonic device in the first direction and having a narrow end coupled to one end of the first planar waveguide; and a second tapered planar waveguide having a height at least equal to the height of the second planar waveguide and having a wide end coupled to a second side of the silicon photonic device in the second direction and having a narrow end coupled to one end of the second planar waveguide; and wherein the silicon photonic device comprises:

a silicon core having a core refractive index; and a structure formed in the silicon core, the structure comprising:

a first refractive index variation pattern extending across the core in a first direction, the first refractive index variation pattern having a first modulation depth; and a second refractive index variation pattern extending across the core in a second direction, substantially orthogonal to the first direction, the second refractive index variation pattern having a second modulation depth, less than the first modulation depth, wherein the first refractive index variation pattern overlays the second refractive index variation pattern, thereby forming a three-dimensional structure, and wherein the first refractive index variation pattern only supports propagation of light having a transverse magnetic mode between the first direction and a third direction, substantially orthogonal to the first direction and the second direction, and the second refractive index variation pattern only supports propagation of light having a transverse electric mode between the second direction and the third direction.

\* \* \* \* \*

UNITED STATES PATENT AND TRADEMARK OFFICE
CERTIFICATE OF CORRECTION

PATENT NO. : 9,810,841 B2
APPLICATION NO. : 15/324550
DATED : November 7, 2017
INVENTOR(S) : Huang et al.

It is certified that error appears in the above-identified patent and that said Letters Patent is hereby corrected as shown below:

On the Title Page

In Item (57), under "ABSTRACT", in Column 2, Line 5, delete "($H_i$);" and insert -- ($H_1$); --, therefor.

In the Specification

In Column 8, Line 43, delete "Av." and insert -- $\Delta$v. --, therefor.

In Column 13, Line 28, delete "node, The" and insert -- node. The --, therefor.

In Column 13, Line 51, delete "$\Delta$v" and insert -- $\Delta$v, --, therefor.

In Column 20, Line 60, delete "FIGS. 3 to 75" and insert -- FIGS. 3 to 7 --, therefor.

In Column 23, Line 15, delete "Av." and insert -- $\Delta$v. --, therefor.

In Column 23, Line 30, delete "$\lambda_1$)" and insert -- $\lambda_1$). --, therefor.

In Column 23, Line 52, delete "output 406" and insert -- output 410 --, therefor.

In the Claims

In Column 31, Line 49, in Claim 17, delete "$\Delta$v" and insert -- $\Delta$v, --, therefor.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*